US010158767B2

(12) United States Patent
Sasa et al.

(10) Patent No.: US 10,158,767 B2
(45) Date of Patent: Dec. 18, 2018

(54) IMAGE CAPTURING APPARATUS, IMAGE FORMING APPARATUS, DISTANCE MEASURING METHOD, AND COMPUTER-READABLE RECORDING MEDIUM

(71) Applicants: Tomohiro Sasa, Kanagawa (JP); Nobuyuki Satoh, Kanagawa (JP); Yuichi Sakurada, Tokyo (JP); Kenji Morita, Kanagawa (JP); Masaya Kawarada, Kanagawa (JP); Daisaku Horikawa, Kanagawa (JP)

(72) Inventors: Tomohiro Sasa, Kanagawa (JP); Nobuyuki Satoh, Kanagawa (JP); Yuichi Sakurada, Tokyo (JP); Kenji Morita, Kanagawa (JP); Masaya Kawarada, Kanagawa (JP); Daisaku Horikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 186 days.

(21) Appl. No.: 15/174,143

(22) Filed: Jun. 6, 2016

(65) Prior Publication Data
US 2016/0366288 A1 Dec. 15, 2016

(30) Foreign Application Priority Data

Jun. 9, 2015 (JP) .................... 2015-116703
Apr. 19, 2016 (JP) .................... 2016-083877

(51) Int. Cl.
H04N 1/04 (2006.01)
H04N 1/00 (2006.01)
(Continued)

(52) U.S. Cl.
CPC ............ *H04N 1/00023* (2013.01); *G01J 3/50* (2013.01); *H04N 1/00031* (2013.01);
(Continued)

(58) Field of Classification Search
CPC .......... G06F 2203/04101; G06F 3/042; G06F 3/0425; G06F 17/145; H04N 1/00023;
(Continued)

(56) References Cited

U.S. PATENT DOCUMENTS 5,099,263 A * 3/1992 Matsumoto ............ G03B 19/07
396/75
5,255,044 A * 10/1993 Ishiguro ................. G03B 7/091
396/238
(Continued)

FOREIGN PATENT DOCUMENTS

JP 2014-181907 9/2014
JP 2014-181909 9/2014

OTHER PUBLICATIONS

U.S. Appl. No. 14/963,901, filed Dec. 9, 2015.

*Primary Examiner* — Negussie Worku
(74) *Attorney, Agent, or Firm* — Oblon, McClelland, Maier & Neustadt, L.L.P.

(57) ABSTRACT

An image capturing apparatus includes: a casing having an opening; a light source arranged inside the casing; a sensor arranged inside the casing and configured to capture, through the opening, an image of an object present outside the casing while the light source is on; and a distance calculator to calculate a distance between the casing and the object, based on an image that has been captured by the sensor and contains, within an image region of the object defined by the opening, a high-luminance region and low-luminance regions located more outside than the high-luminance region.

13 Claims, 21 Drawing Sheets

(51) Int. Cl.
*H04N 1/60* (2006.01)
*G01J 3/50* (2006.01)
*H04N 1/387* (2006.01)

(52) U.S. Cl.
CPC ..... *H04N 1/00034* (2013.01); *H04N 1/00087* (2013.01); *H04N 1/00249* (2013.01); *H04N 1/3872* (2013.01); *H04N 1/603* (2013.01)

(58) Field of Classification Search
CPC ........... H04N 1/00031; H04N 1/00034; H04N 1/00087; H04N 1/00249; H04N 1/603; H04N 5/2352; H04N 5/2353; H04N 5/238; H04N 5/3454; H04N 5/3532; H04N 1/3872; H04N 5/332; H04N 7/18
USPC ......... 348/E5.024, E5.037, 143, 333.01, 362
See application file for complete search history.

(56) References Cited

U.S. PATENT DOCUMENTS

| | | | | |
|---|---|---|---|---|
| 5,991,010 | A * | 11/1999 | Nishio | H04N 1/0284 355/40 |
| 7,236,712 | B2 * | 6/2007 | Matsuyama | G03G 15/0194 347/116 |
| 9,746,966 | B2 * | 8/2017 | Suzuki | G06F 3/0425 |
| 9,800,776 | B2 * | 10/2017 | Uchida | G02B 7/28 |
| 2011/0277361 | A1 * | 11/2011 | Nichol | G02B 6/0018 40/541 |
| 2012/0069411 | A1 | 3/2012 | Satoh et al. | |
| 2012/0188432 | A1 * | 7/2012 | Kubota | H04N 5/2352 348/333.01 |
| 2012/0236308 | A1 | 9/2012 | Satoh | |
| 2013/0027720 | A1 | 1/2013 | Satoh | |
| 2013/0027721 | A1 | 1/2013 | Kobayashi et al. | |
| 2013/0135484 | A1 | 5/2013 | Satoh et al. | |
| 2013/0155723 | A1 * | 6/2013 | Coleman | G02B 6/0018 362/621 |
| 2013/0208289 | A1 | 8/2013 | Satoh et al. | |
| 2013/0229671 | A1 | 9/2013 | Yokozawa et al. | |
| 2013/0242319 | A1 | 9/2013 | Suzuki et al. | |
| 2013/0242320 | A1 | 9/2013 | Suzuki et al. | |
| 2013/0242321 | A1 | 9/2013 | Okada et al. | |
| 2013/0242361 | A1 | 9/2013 | Matsumoto et al. | |
| 2013/0258368 | A1 | 10/2013 | Shigemoto et al. | |
| 2013/0258369 | A1 | 10/2013 | Suzuki et al. | |
| 2014/0009611 | A1 * | 1/2014 | Hiebl | F41G 1/36 348/143 |
| 2014/0218754 | A1 | 8/2014 | Satoh et al. | |
| 2015/0070737 | A1 | 3/2015 | Hirata et al. | |
| 2015/0085305 | A1 | 3/2015 | Suzuki et al. | |
| 2015/0109646 | A1 | 4/2015 | Yokozawa et al. | |
| 2015/0146053 | A1 | 5/2015 | Satoh et al. | |
| 2015/0158309 | A1 * | 6/2015 | Fujii | G01N 21/251 347/19 |
| 2015/0162372 | A1 | 6/2015 | Yorimoto et al. | |
| 2015/0248597 | A1 | 9/2015 | Matsumoto et al. | |
| 2015/0375496 | A1 | 12/2015 | Horikawa et al. | |
| 2016/0004202 | A1 | 1/2016 | Morita et al. | |
| 2016/0031250 | A1 | 2/2016 | Yokozawa et al. | |
| 2016/0080610 | A1 | 3/2016 | Kawarada et al. | |
| 2016/0080611 | A1 | 3/2016 | Yorimoto et al. | |
| 2016/0347052 | A1 * | 12/2016 | Kawarada | B41J 2/04505 |
| 2016/0366288 | A1 * | 12/2016 | Sasa | H04N 1/00023 |
| 2017/0117314 | A1 * | 4/2017 | Nobayashi | H01L 27/14627 |
| 2017/0302821 | A1 * | 10/2017 | Sasa | H04N 1/409 |
| 2017/0361605 | A1 * | 12/2017 | Kawarada | G01B 11/14 |

* cited by examiner

IMAGE CAPTURING APPARATUS, IMAGE FORMING APPARATUS, DISTANCE MEASURING METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2015-116703 filed in Japan on Jun. 9, 2015 and Japanese Patent Application No. 2016-083877 filed in Japan on Apr. 19, 2016. The contents of which are incorporated herein by reference in their entirety.

BACKGROUND OF THE INVENTION

1. Field of the Invention

The present invention relates to an image capturing apparatus, an image forming apparatus, a distance measuring method, and a computer-readable recording medium.

2. Description of the Related Art

Conventionally known image capturing apparatuses include those that capture an image of a color pattern formed by an image forming apparatus on a recording medium using coloring material such as ink, convert RGB values of the color pattern that are obtained from the image capturing into color specification values (colorimetric values) in a standard color space, and output the color specification values (refer to, for example, Japanese Patent Application Laid-open No. 2014-181907). Colorimetric values of a color pattern that are output from an image capturing apparatus of this type are used, for example, for color adjustment in an image forming apparatus. Color adjustment in an image forming apparatus can be carried out by, instead of converting RGB values into colorimetric values, using RGB values of a color pattern that are obtained from image capturing.

The image capturing apparatus of this type carries out the image capturing while irradiating, with light from a light source provided inside a casing, an object (the color pattern formed on a recording medium) present outside the casing. Consequently, the intensity of light with which the object is irradiated varies depending on the distance between the casing and the object, and RGB values obtained from the image capturing may be therefore unstable. Given this situation, an image capturing apparatus disclosed in Japanese Patent Application Laid-open No. 2014-181907 is configured to be able to measure the distance between a casing and an object present outside the casing. Specifically, the image capturing apparatus disclosed in Japanese Patent Application Laid-open No. 2014-181907 has a mark portion for distance measurement provided on a light-permeable member arranged between a light source and the object, and is configured to measure the distance between the casing and the object based on an image of a shadow of the mark portion that is obtained from the image capturing.

However, a distance measuring method employed by the image capturing apparatus disclosed in Japanese Patent Application Laid-open No. 2014-181907 involves a cumbersome process of providing the mark portion for distance measurement to the light-permeable member. For this reason, a technique is desired that enables easier measurement of the distance between a casing and an object.

SUMMARY OF THE INVENTION

It is an object of the present invention to at least partially solve the problems in the conventional technology.

According to exemplary embodiments of the present invention, there is provided an image capturing apparatus comprising: a casing having an opening; a light source arranged inside the casing; a sensor arranged inside the casing and configured to capture, through the opening, an image of an object present outside the casing while the light source is on; and a distance calculator to calculate a distance between the casing and the object, based on an image that has been captured by the sensor and contains, within an image region of the object defined by the opening, a high-luminance region and low-luminance regions located more outside than the high-luminance region.

Exemplary embodiments of the present invention also provide an image forming apparatus comprising the above-described image capturing apparatus.

Exemplary embodiments of the present invention also provide a distance measuring method to be performed by an image capturing apparatus including a casing having an opening, a light source arranged inside the casing, and a sensor arranged inside the casing and configured to capture, through the opening, an image of an object present outside the casing while the light source is on, the distance measuring method comprising: calculating a distance between the casing and the object, based on an image that has been captured by the sensor and contains, within an image region of the object defined by the opening, a high-luminance region and low-luminance regions located on outer sides of the high-luminance region.

Exemplary embodiments of the present invention also provide a non-transitory computer-readable recording medium that contains a computer program for causing an image capturing apparatus to implement a function, the image capturing apparatus including a casing having an opening, a light source arranged inside the casing, and a sensor arranged inside the casing and configured to capture, through the opening, an image of an object present outside the casing while the light source is on, the function comprising: calculating a distance between the casing and the object, based on an image that has been captured by the sensor and contains, within an image region of the object defined by the opening, a high-luminance region and low-luminance regions located on outer sides of the high-luminance region.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
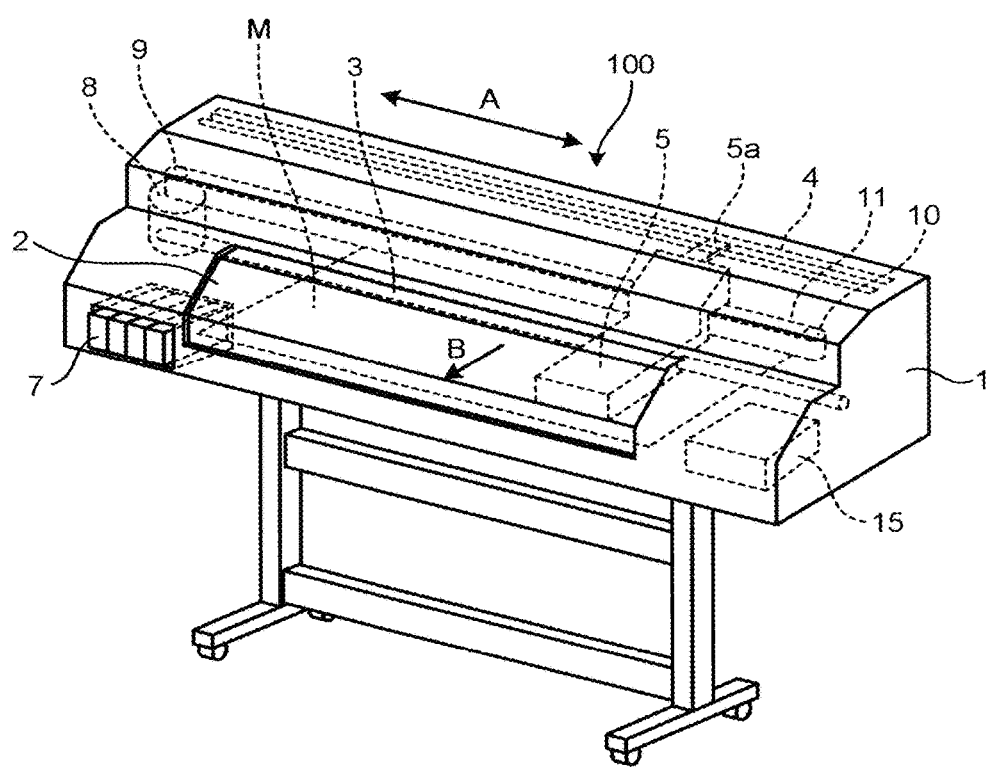
FIG. 1 is a see-through perspective view illustrating the inside of an image forming apparatus according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The following describes an image capturing apparatus, an image forming apparatus, a distance measuring method, and a computer-readable recording medium having a computer program according to an embodiment of the present invention in detail with reference to the accompanying drawings. Although the following embodiment takes an inkjet printer as an example of the image forming apparatus to which the present invention is applied, the present invention is widely applicable to image forming apparatuses of various types that print images on recording media.

Mechanical Configuration of Image Forming Apparatus

First, the mechanical configuration of an image forming apparatus 100 according to the present embodiment is described with reference to FIG. 1 to FIG. 3. FIG. 1 is a see-through perspective view illustrating the inside of the image forming apparatus 100, FIG. 2 is a top view illustrating the mechanical configuration of the inside of the image forming apparatus 100, and FIG. 3 is a diagram illustrating an example arrangement of recording heads 6 installed in a carriage 5.

As illustrated in FIG. 1, the image forming apparatus 100 according to the present embodiment includes the carriage 5 that reciprocates along a main-scanning direction (the arrow A directions in the drawing). The carriage 5 is supported by a main guide rod 3 extending in the main-scanning direction. The carriage 5 includes a connecting piece 5a. The connecting piece 5a engages with a sub guide member 4 provided parallel to the main guide rod 3 and stabilizes the attitude of the carriage 5.

Figure 2:
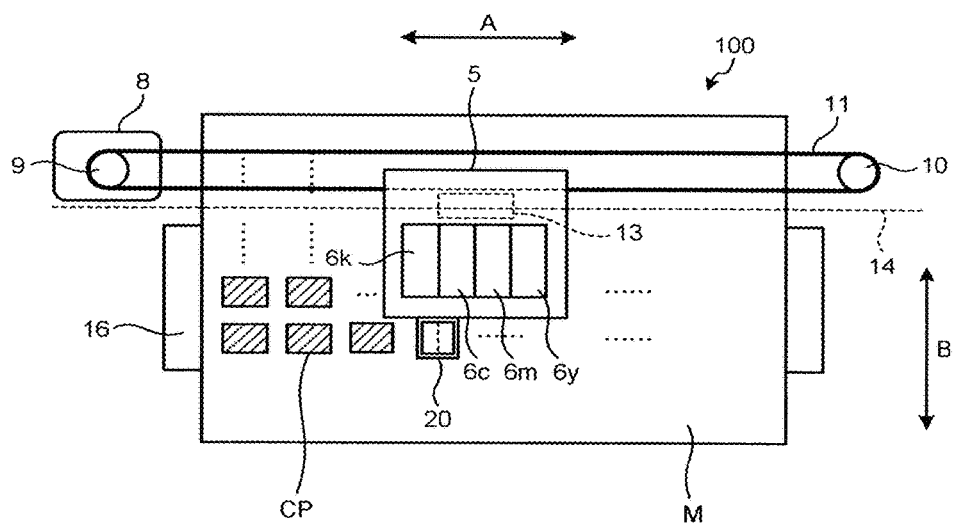
FIG. 2 is a top view illustrating the mechanical configuration of the inside of the image forming apparatus.
Figure 3:
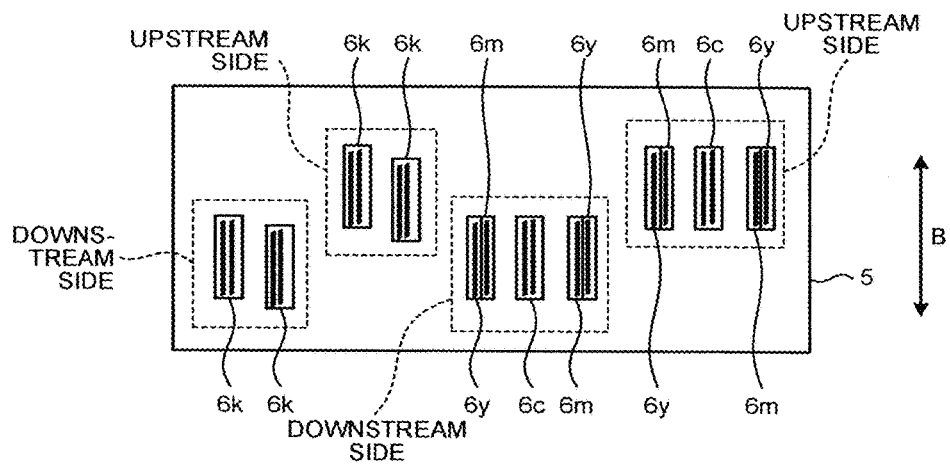
FIG. 3 is a diagram illustrating an example arrangement of recording heads installed in a carriage installed in the image forming apparatus.

The carriage 5 has recording heads 6y, 6m, 6c, and 6k installed therein, as illustrated in FIG. 2. The recording head 6y is a recording head that ejects yellow (Y) ink. The recording head 6m is a recording head that ejects magenta (M) ink. The recording head 6c is a recording head that ejects cyan (C) ink. The recording head 6k is a recording head that ejects black (Bk) ink. These recording heads 6y, 6m, 6c, and 6k are hereinafter collectively referred to as recording heads 6, as appropriate. The recording heads 6 are supported by the carriage 5 in such a manner that ink ejection surfaces (nozzle surfaces) thereof face downward (toward a recording medium M).

Cartridges 7 provided as ink supplying members for supplying ink to the respective recording heads 6 are not installed in the carriage 5 but are arranged at a certain position within the image forming apparatus 100. The cartridges 7 are coupled to the recording heads 6 through pipes, so that the ink is supplied from the cartridges 7 to the recording heads 6 through the pipes.

The carriage 5 is coupled to a timing belt 11 stretched between a drive pulley 9 and a driven pulley 10. The drive pulley 9 rotates when a main-scanning motor 8 drives. The driven pulley 10 has a mechanism to adjust the distance to the drive pulley 9 and functions to give certain tension to the timing belt 11. When the main-scanning motor 8 drives, the timing belt 11 is moved forward to cause the carriage 5 to reciprocate in the main-scanning direction. As illustrated in FIG. 2, for example, the movement of the carriage 5 in the main-scanning direction is controlled based on an encoder value obtained by having a mark of an encoder sheet 14 detected by an encoder sensor 13 provided in the carriage 5.

The image forming apparatus 100 according to the present embodiment includes a maintenance mechanism 15 for maintaining the reliability of the recording heads 6. The maintenance mechanism 15 performs, for example, cleaning and capping of the ejection surfaces of the recording heads 6 and discharge of excess ink from the recording heads 6.

As illustrated in FIG. 2, a platen 16 is arranged at a position facing the ejection surfaces of the recording heads 6. The platen 16 supports the recording medium M when the recording heads 6 eject ink onto the recording medium M. The recording medium M is held between conveying rollers that are driven by a sub-scanning motor 12 to be described later (refer to FIG. 9) and is intermittently conveyed on the platen 16 in a sub-scanning direction.

The recording heads 6 eject ink onto the recording medium M on the platen 16, thereby forming an image on the recording medium M. In the present embodiment, in order to secure an ample width of an image that can be formed by one scanning of the carriage 5, upstream side recording heads 6 and downstream side recording heads 6 are installed in the carriage 5 as illustrated in FIG. 3. The number of recording heads 6k that eject black ink installed in the carriage 5 is twice as many as each of the numbers of recording heads 6y, recording heads 6m, and recording heads 6c that eject color ink. The recording heads 6y are arranged laterally separated from each other, and the recording heads 6m are arranged laterally separated from each other. This arrangement is intended to make the superimposing order of colors consistent between the two directions of the reciprocating motion of the carriage 5 to prevent colors from being different between the two directions. The arrangement of the recording heads 6 illustrated in FIG. 3 is an example, and the arrangement thereof is not limited to the one illustrated in FIG. 3.

The components constituting the image forming apparatus 100 according to the present embodiment are arranged inside an exterior body 1. The exterior body 1 includes a cover member 2 provided so as to be openable and closable. During the maintenance of the image forming apparatus 100 or when a paper jam has occurred, the cover member 2 is opened, so that work on the components arranged inside the exterior body 1 can be performed.

The image forming apparatus 100 according to the present embodiment intermittently conveys the recording medium M in the sub-scanning direction (the arrow B direction in the drawing). During times when it stops conveying the recording medium M in the sub-scanning direction, the image forming apparatus 100 ejects ink from the recording heads 6 installed in the carriage 5 onto the recording medium M on the platen 16 while moving the carriage 5 in the main-scanning directions, thereby printing an image on the recording medium M.

In particular, when color adjustment is carried out in the image forming apparatus 100, ink is ejected onto the recording medium M on the platen 16 from the recording heads 6 installed in the carriage 5 as illustrated in FIG. 2, so that a color pattern CP is formed, and colorimetry is then performed on this color pattern CP. The color pattern CP is an image actually formed on the recording medium M by the image forming apparatus 100 using ink, and reflects characteristics unique to the image forming apparatus 100. Thus, colorimetric values of this color pattern CP can be used for generating or correcting a device profile that describes the characteristics unique to the image forming apparatus 100. Performing color conversion between a standard color space and each device-dependent color based on the device profile enables the image forming apparatus 100 to output images with high reproducibility.

The image forming apparatus 100 according to the present embodiment includes a colorimetric camera (image capturing apparatus) 20 for performing colorimetry on the color pattern CP formed on the recording medium M. As illustrated in FIG. 2, the colorimetric camera 20 is supported by the carriage 5 in which the recording heads 6 are installed. The conveyance of the print medium M and the movement of the carriage 5 cause the colorimetric camera 20 to move over the recording medium M having the color pattern CP printed thereon. When having arrived at a position facing the color pattern CP, the colorimetric camera 20 captures an image thereof. Based on RGB values of the color pattern CP obtained from image capturing, the colorimetric values of the color pattern CP are calculated. The present embodiment is described by way of an example in which color adjustment in the image forming apparatus 100 is performed using colorimetric values of the color pattern CP obtained from image capturing that are calculated from RGB values of the color pattern CP. However, color adjustment in the image forming apparatus 100 can alternatively be performed using RGB values of a color pattern CP obtained from image capturing. In this case, the amounts of ink ejected from the recording heads 6 are adjusted based on the color adjustment.

Mechanical Configuration of Colorimetric Camera

Figure 4:
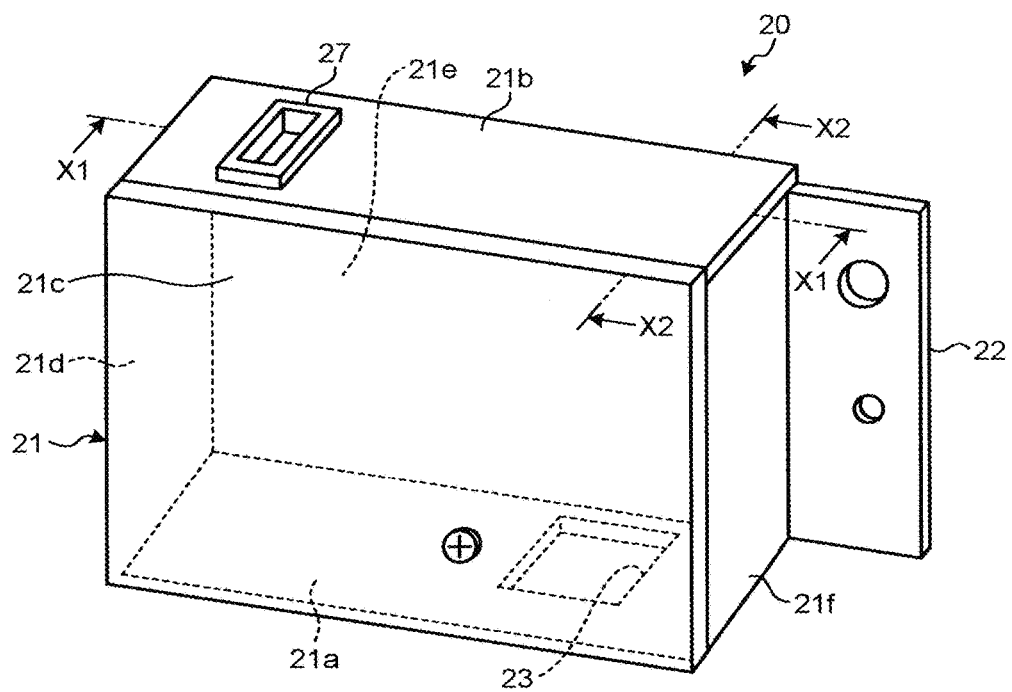
FIG. 4 is a perspective view illustrating the external appearance of a colorimetric camera attached on the carriage.
Figure 5:
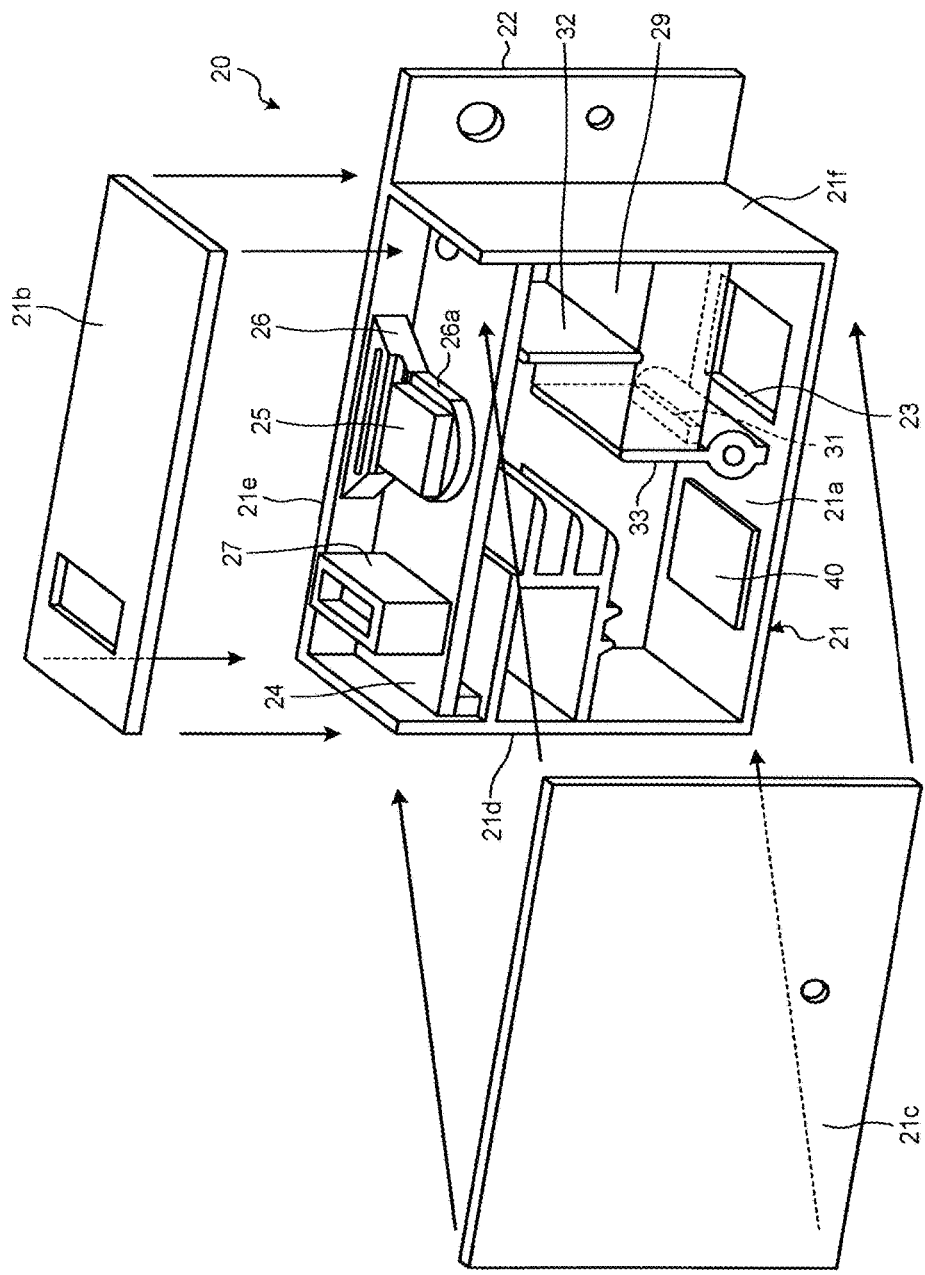
FIG. 5 is an exploded perspective view of the colorimetric camera.
Figure 6:
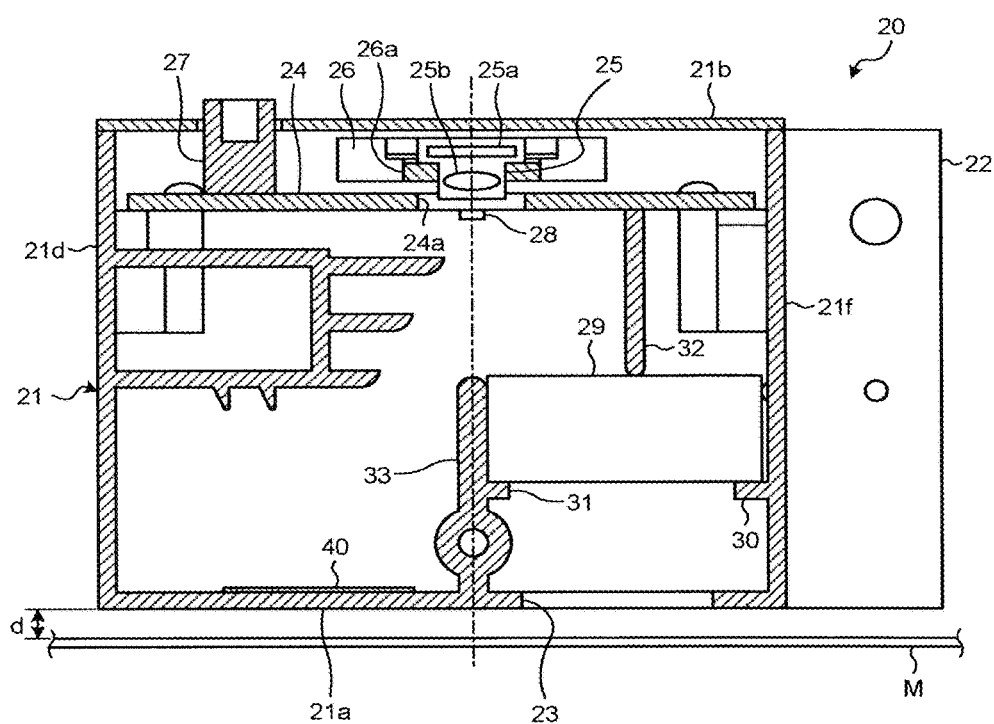
FIG. 6 is a vertical sectional view of the colorimetric camera taken along the X1-X1 line in FIG. 4.
Figure 7:
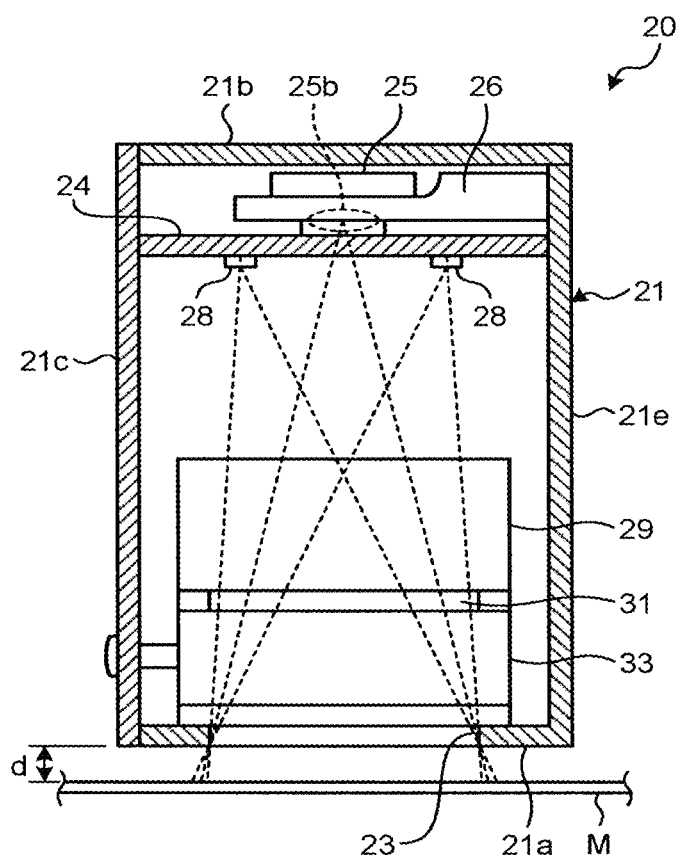
FIG. 7 is a vertical sectional view of the colorimetric camera taken along the X2-X2 line in FIG. 4.

Next, the mechanical configuration of the calorimetric camera 20 according to the present embodiment is described with reference to FIG. 4 to FIG. 7. FIG. 4 is a perspective view illustrating the external appearance of the colorimetric camera 20. FIG. 5 is an exploded perspective view of the colorimetric camera 20. FIG. 6 is a vertical sectional view of the colorimetric camera 20 taken along the X1-X1 line in FIG. 4. FIG. 7 is a vertical sectional view of the colorimetric camera 20 taken along the X2-X2 line in FIG. 4.

The colorimetric camera 20 includes a casing 21 having a mounting tab 22 formed integrally therewith as illustrated in FIG. 4 and FIG. 5. The casing 21 has, for example, a bottom plate part 21a and a top plate part 21b that face each other with a certain distance therebetween, and side wall parts 21c, 21d, 21e, and 21f that each interconnect these bottom plate part 21a and top plate part 21b. While the bottom plate part 21a and the side wall parts 21d, 21e, and 21f of the casing 21 are integrally formed, for example, by mold forming together with the mounting tab 22, the top plate part 21b and the side wall part 21c thereof are configured so as to be detachable. FIG. 5 illustrates a state thereof with the top plate part 21b and the side wall part 21c detached therefrom.

The colorimetric camera 20 is attached to the carriage 5, for example, by being secured to a side surface portion of the carriage 5 with a fastening member, such as a screw, with the side wall part 21e and the mounting tab 22 of the casing 21 abutting the side surface portion of the carriage 5. In this situation, the colorimetric camera 20 is attached to the carriage 5 so that the bottom plate part 21a of the casing 21 can face the recording medium M on the platen 16 while being substantially parallel thereto with a gap d, as illustrated in FIG. 6 and FIG. 7. The size of the gap d corresponds to the distance between an object to be imaged by a sensor unit 25 to be described later and the casing 21. This distance changes, for example, depending on such factors as the thickness of the recording medium M and the state of irregularities on the surface of the platen 16 that supports the recording medium M.

The bottom plate part 21a of the casing 21, which faces the recording medium M on the platen 16, has an opening 23 provided for enabling an object outside the casing 21 (or the color pattern CP formed on the recording medium M when colorimetry is performed on the color pattern CP) to be imaged from the inside of the casing 21. The bottom plate part 21a of the casing 21 also has a reference chart 40 arranged on the inner surface side thereof so as to be aligned next to the opening 23 with a supporting member 33 placed therebetween. The reference chart 40 is imaged together with the color pattern CP by the sensor unit 25 to be described later when colorimetry is performed on the color pattern CP and when RGB values are acquired. The reference chart 40 is to be described later in detail.

In one side of the inside of the casing 21 that faces the top plate part 21b, a circuit board 24 is arranged. The sensor unit 25 that captures an image is arranged between the top plate part 21b of the casing 21 and the circuit board 24. The sensor unit 25, as illustrated in FIG. 6, includes a two-dimensional image sensor 25a such as a charge-coupled device (CCD) sensor or a complementary metal-oxide semiconductor (CMOS) sensor, and a lens 25b that focuses, on a light receiving surface (imaging region) of the two-dimensional image sensor 25a, an optical image of an imaging range of the sensor unit 25.

The sensor unit 25 is held by, for example, a sensor holder 26 formed integrally with the side wall part 21e of the casing 21. The sensor holder 26 has a ring part 26a provided in a position facing a through hole 24a provided to the circuit board 24. The ring part 26a has a through hole having a size corresponding to the external shape of a protruding portion of the sensor unit 25 in one side thereof having the lens 25b. By having the protruding portion in the one side having the lens 25b inserted through the ring part 26a of the sensor holder 26, the sensor unit 25 is held by the sensor holder 26 in such a manner that the lens 25b can observe the bottom plate part 21a of the casing 21 through the through hole 24a in the circuit board 24.

In this situation, an optical axis of the sensor unit 25 indicated by the dashed-dotted line in FIG. 6 is substantially perpendicular to the bottom plate part 21a of the casing 21, and the sensor unit 25 is held by the sensor holder 26 while being aligned thereby so that the opening 23 and the reference chart 40 to be described later can be contained in an imaging range. The sensor unit 25 can thus capture, within a part of the imaging region of the two-dimensional image sensor 25a, an image of an object (the color pattern CP formed on the recording medium M) outside the casing 21 through the opening 23 at the same time as capturing, within another part of the imaging range of the two-dimensional image sensor 25a, the reference chart 40 arranged inside the casing 21.

The sensor unit 25 is electrically connected to the circuit board 24 having various electronic components mounted thereon, for example, through a flexible cable. The circuit board 24 mounts thereon an external connection connector 27, to which a connection cable for use in connecting the colorimetric camera 20 to a main control board 120 (refer to FIG. 9) to be described later of the image forming apparatus 100 is attached.

Inside the casing 21, a light source 28 is also provided for use in substantially uniformly lighting the imaging range when the sensor unit 25 captures an image. For example, a light emitting diode (LED) is used as the light source 28. In the present embodiment, as illustrated in FIG. 7, two LEDs are used as the light sources 28. The two LEDs are arranged, uniformly with respect to the center of the lens 25b of the sensor unit 25, in a direction perpendicular to a direction in which the opening 23 and the reference chart 40 are aligned next to each other.

The two LEDs used for the light sources 28 are, for example, mounted on a surface of the circuit board 24 that faces the bottom plate part 21a. However, the light sources 28 only need to be arranged at positions such that the imaging range of the sensor unit 25 can be substantially uniformly illuminated with diffusion light, and do not necessarily need to be mounted directly on the circuit board 24. Although an LED is used as the light source 28 in the present embodiment, the type of the light source 28 is not limited to an LED. For example, an organic electroluminescence (EL) may be used as the light source 28. When an organic EL is used as the light source 28, illumination light having a spectral distribution similar to that of sunlight is obtained, and the colorimetric accuracy can be improved.

Inside the casing 21, an optical path length changing member 29 is arranged in an optical path between the sensor unit 25 and an object (the color pattern CP formed on the recording medium M) present outside the casing 21, the image of which is captured by the sensor unit 25 through the opening 23. The optical path length changing member 29 is an optical element having sufficient transmittance for light from the light sources 28 and having a refractive index of n. The optical path length changing member 29 has the function of bringing an imaging plane of an optical image of the object outside the casing 21 closer to an imaging plane of an optical image of the reference chart 40 inside the casing 21. In other words, the colorimetric camera 20 according to the present embodiment has the optical path length changing member 29 arranged in the optical path between the sensor unit 25 and the object outside the casing 21 to change the length of the optical path, so that an imaging plane of an optical image of a patch serving as the object outside the casing 21 and the imaging plane of an optical image of the reference chart 40 inside the casing 21 are both positioned at the light receiving surface of the two-dimensional image sensor 25a of the sensor unit 25. The sensor unit 25 can thus capture images with focuses on both the object outside the casing 21 and the reference chart 40 inside the casing 21.

In the optical path length changing member 29, opposite ends of a surface thereof facing the bottom plate part 21a are supported by a pair of ribs 30 and 31, for example, as illustrated in FIG. 6. In addition, a pressing member 32 is interposed between a surface of the optical path length changing member 29 facing the top plate part 21b and the circuit board 24, so that the optical path length changing member 29 is immobilized after being placed inside the casing 21. The optical path length changing member 29 is arranged so as to block the opening 23 in the bottom plate part 21a of the casing 21, and consequently has the function of preventing impurities, such as ink mist and dust, that have entered the casing 21 from outside the casing 21 through the opening 23 from adhering to such components as the sensor unit 25, the light sources 28, and the reference chart 40.

In colorimetry on the color pattern CP, the colorimetric camera 20 according to the present embodiment turns on the light sources 28 provided inside the casing 21, and causes the sensor unit 25 to capture an image of the color pattern CP formed on the recording medium M outside the casing 21, the color pattern CP being irradiated with light from the light sources 28. Consequently, the intensity of light that the color pattern CP is irradiated with varies depending on the distance between the casing 21 and a recording surface of the recording medium M having the color pattern CP formed thereon (the size of the gap d), and RGB values of the color pattern CP that are obtained from image capturing are unstable in some cases. Given this situation, the colorimetric camera 20 according to the present embodiment has the function of calculating the distance between the casing 21 and a recording surface of the recording medium M having the color pattern CP formed thereon, and then correcting, based on the calculated distance, RGB values of the color pattern CP that are obtained from image capturing by the sensor unit 25. Functions of the colorimetric camera 20 as this function are described later in detail.

The above-described mechanical configuration of the colorimetric camera 20 is merely an example, and is not limiting. The colorimetric camera 20 according to the present embodiment only needs to be configured at least to cause the sensor unit 25 provided inside the casing 21 to capture an image of the object outside of the casing 21 through the opening 23 while the light sources 28 provided inside the casing 21 are on, and the above-described configuration thereof can be variously modified and changed. For example, although the above-described colorimetric camera 20 has the reference chart 40 arranged on the inner surface of the bottom plate part 21a of the casing 21, the colorimetric camera 20 may be configured in such a manner that, while an opening different from the opening 23 is provided at a position in the bottom plate part 21a of the casing 21 at which the reference chart 40 is to be arranged, the reference chart 40 is attached, at the position having this opening provided, to the outside of the casing 21. In this case, consequently, the sensor unit 25 captures, through the opening 23, an image of the color pattern CP formed on the recording medium M, and captures, through the opening different from the opening 23, the reference chart 40 attached to the outside of the bottom plate part 21a of the casing 21. This example is advantageous in that the reference chart 40 can be easily replaced when being in trouble such as being dirty.

Specific Example of Reference Chart

Figure 8:
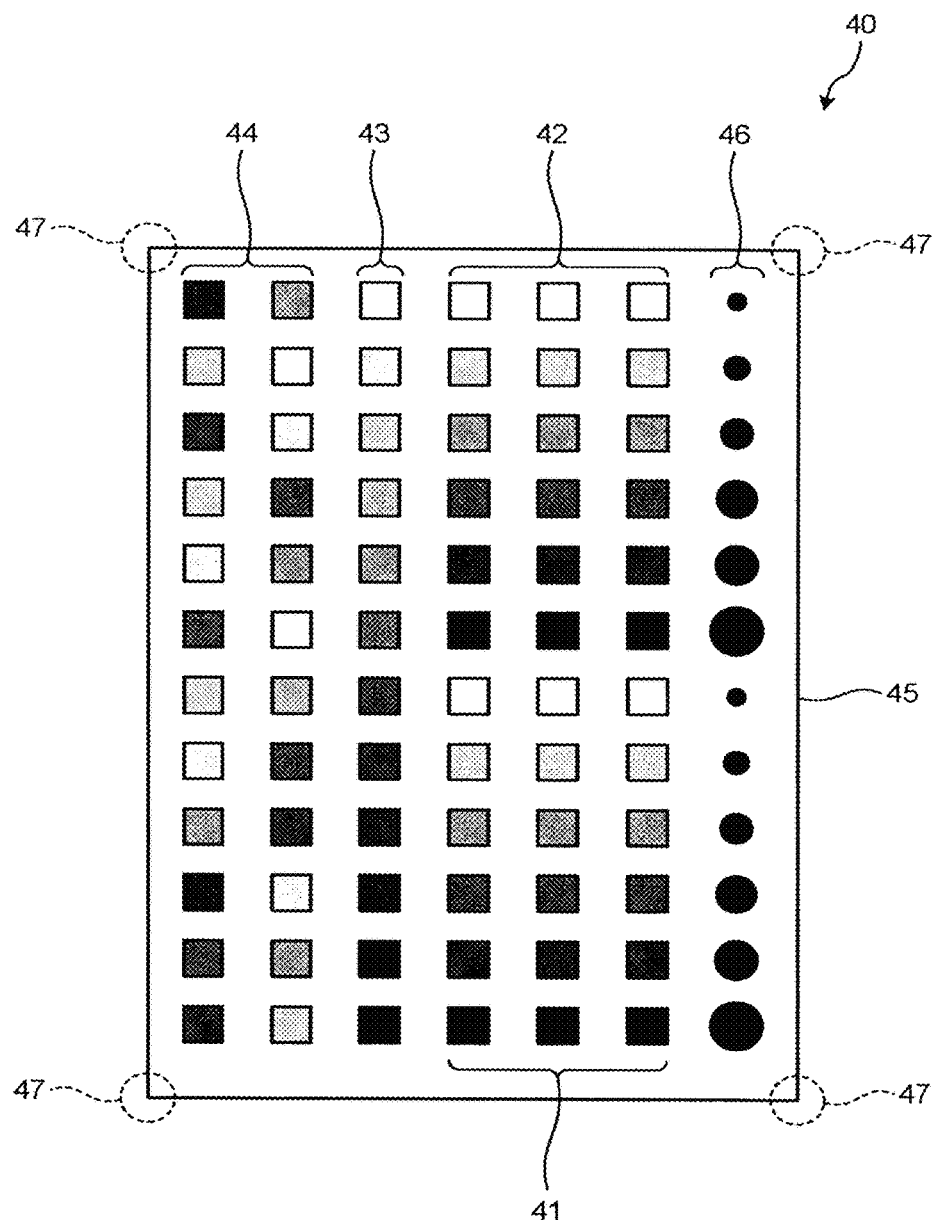
FIG. 8 is a diagram illustrating a specific example of a reference chart.

Next, a specific example of the reference chart 40 arranged in the casing 21 of the colorimetric camera 20 is described with reference to FIG. 8. FIG. 8 is a diagram illustrating a specific example of the reference chart 40.

The reference chart 40 illustrated in FIG. 8 contains a plurality of reference patch arrays 41 to 44 in each of which colorimetric reference patches are arrayed, a dot diameter measuring pattern array 46, a distance measuring line 45, and chart position specifying markers 47.

The reference patch arrays 41 to 44 include: the reference patch array 41 in which reference patches of the primary colors of YMCK are arranged in the order of gray levels; the reference patch array 42 in which reference patches of the secondary colors of RGB are arranged in the order of gray levels; the reference patch array 43 in which gray scale reference patches are arranged in the order of gray levels; and the reference patch array 44 in which tertiary color reference patches are arranged. The dot diameter measuring pattern array 46 is a pattern array for geometrical shape measurement in which circular patterns having different sizes are arranged in the order of size, and can be used for measuring a dot diameter of an image printed on the recording medium M.

The distance measuring line 45 is formed as a rectangular frame that surrounds the reference patch arrays 41 to 44 and the dot diameter measuring pattern array 46. The chart position specifying markers 47 are arranged at the four corners of the distance measuring line 45 and function as markers for use in specifying the positions of the respective reference patches. The position of the reference chart 40 and the positions of the respective reference patches and patterns can be specified when the distance measuring line 45 and the chart position specifying markers 47 at the four corners are specified from an image of the reference chart 40 imaged by the sensor unit 25.

The respective reference patches constituting the colorimetric reference patch arrays 41 to 44 are used as references of hues reflecting imaging conditions of the colorimetric camera 20. The configuration of the colorimetric reference patch arrays 41 to 44 arranged on the reference chart 40 is not limited to the example illustrated in FIG. 8, and any desired reference patch array can be used. For example, a reference patch that can specify a color range as widely as possible may be used, and the reference patch array 41 of the primary colors of YMCK and the gray scale reference patch array 43 may be formed by patches of colorimetric values of ink used in the image forming apparatus 100. The reference patch array 42 of the secondary colors of RGB may be composed of patches of colorimetric values of colors that can be produced by ink used in the image forming apparatus 100 or may be a reference color chart, such as Japan Color, that provides defined colorimetric values.

Although the present embodiment uses the reference chart 40 including the reference patch arrays 41 to 44 composed of patches each having a general patch (color card) shape, the reference chart 40 does not necessarily need to have such reference patch arrays 41 to 44. The reference chart 40 only needs to have a plurality of colors usable for colorimetry arranged so that their respective positions can be specified.

As described above, the reference chart 40 is arranged so as to be aligned next to the opening 23 on the inner surface side of the bottom plate part 21a of the casing 21. The sensor unit 25 can thus capture an image of the reference chart 40 at the same time as capturing an image of the object outside the casing 21. Here, capturing the images at the same time means acquiring one frame of image data containing the object outside the casing 21 and the reference chart 40. In other words, acquiring image data containing the object outside the casing 21 and the reference chart 40 in one frame means capturing the object outside the casing 21 and the reference chart 40, regardless of time differences in pixel-by-pixel data acquisition.

Schematic Configuration of Control Mechanism for Image Forming Apparatus

Figure 9:
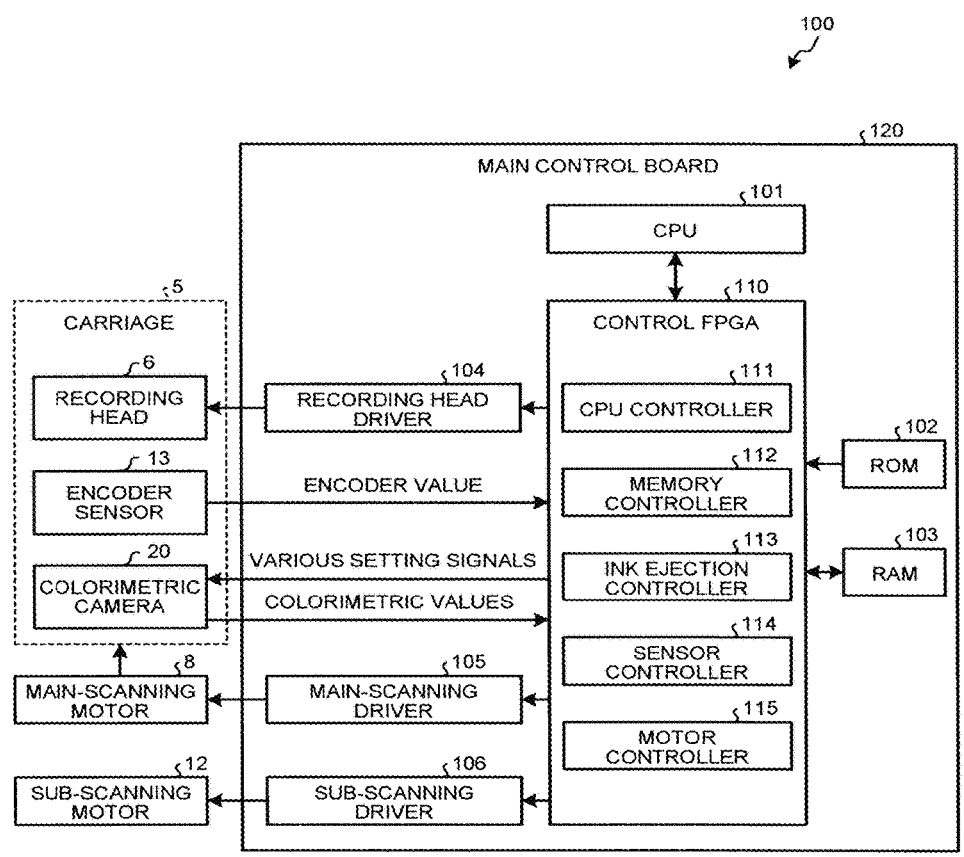
FIG. 9 is a block diagram illustrating an example configuration of a control mechanism for the image forming apparatus.

Next, a schematic configuration of a control mechanism for the image forming apparatus 100 according to the present embodiment is described with reference to FIG. 9. FIG. 9 is a block diagram illustrating an example configuration of the control mechanism for the image forming apparatus 100.

As illustrated in FIG. 9, the image forming apparatus 100 according to the present embodiment includes a central processing unit (CPU) 101, a read only memory (ROM) 102, a random access memory (RAM) 103, a recording head driver 104, a main-scanning driver 105, a sub-scanning driver 106, a controlling field-programmable gate array (FPGA) 110, the recording heads 6, the colorimetric camera 20, the encoder sensor 13, the main-scanning motor 8, and the sub-scanning motor 12. The CPU 101, the ROM 102, the RAM 103, the recording head driver 104, the main-scanning driver 105, the sub-scanning driver 106, and the controlling FPGA 110 are mounted on the main control board 120. The recording head 6, the encoder sensor 13, and the colorimetric camera 20 are mounted on the carriage 5 as described above.

The CPU 101 controls the entire image forming apparatus 100. For example, the CPU 101, while using the RAM 103 as a work area, executes various control programs stored in the ROM 102 and outputs control instructions for controlling various operations in the image forming apparatus 100.

The recording head driver 104, the main-scanning driver 105, and the sub-scanning driver 106 are drivers for driving the recording heads 6, the main-scanning motor 8, and the sub-scanning motor 12, respectively.

The controlling FPGA 110 controls the various operations in the image forming apparatus 100 in cooperation with the CPU 101. The controlling FPGA 110 includes as functional components, for example, a CPU controller 111, a memory controller 112, an ink ejection controller 113, a sensor controller 114, and a motor controller 115.

The CPU controller 111 communicates with the CPU 101, thereby transmitting various types of information acquired by the controlling FPGA 110 to the CPU 101 and receiving control instructions output from the CPU 101.

The memory controller 112 performs memory control for enabling the CPU 101 to access the ROM 102 and the RAM 103.

The ink ejection controller 113 controls operations of the recording head driver 104 in accordance with control instructions from the CPU 101, thereby controlling the timing of ink ejection from the recording heads 6 driven by the recording head driver 104.

The sensor controller 114 performs processing on sensor signals such as an encoder value output from the encoder sensor 13.

The motor controller 115 controls operations of the main-scanning driver 105 in accordance with control instructions from the CPU 101, thereby controlling the main-scanning motor 8 driven by the main-scanning driver 105 and controlling the movement of the carriage 5 in the main-scanning directions. The motor controller 115 controls operations of the sub-scanning driver 106 in accordance with control instructions from the CPU 101, thereby controlling the sub-scanning motor 12 driven by the sub-scanning driver 106 and controlling the movement of the recording medium M in the sub-scanning direction on the platen 16.

The above components are examples of control functions implemented by the controlling FPGA 110, and various control functions in addition to these may be implemented by the controlling FPGA 110. The whole or part of the above-mentioned control functions may be implemented by computer programs executed by the CPU 101 or another general-purpose CPU. Part of the above control functions may be implemented by dedicated hardware, such as another FPGA other than the controlling FPGA 110 and an application specific integrated circuit (ASIC).

The recording heads 6 are driven by the recording head driver 104 the operations of which are controlled by the CPU 101 and the controlling FPGA 110, and form an image by ejecting ink onto the recording medium M on the platen 16.

The encoder sensor 13 outputs, to the controlling FPGA 110, an encoder value obtained by detecting the mark on the encoder sheet 14. The encoder value is then sent from the controlling FPGA 110 to the CPU 101 and is used for, for example, calculating the position and speed of the carriage 5. Based on the position and speed of the carriage 5 calculated from the encoder value, the CPU 101 generates and outputs control instructions for controlling the main-scanning motor 8.

As described above, in color adjustment in the image forming apparatus 100, the colorimetric camera 20 causes the sensor unit 25 to simultaneously capture images of the color pattern CP formed on the recording medium M and the reference chart 40, and then, based on the RGB values of the color pattern CP and the RGB values of respective reference patches of the reference chart 40 that are obtained from the captured images, calculates colorimetric values (which are color specification values in a standard color space and, for example, are L*a*b values in an L*a*b color space) of the color pattern CP. The colorimetric values of the color pattern CP calculated by the colorimetric camera 20 are fed to the CPU 101 through the controlling FPGA 110. A method disclosed in Japanese Patent Application Laid-open No. 2013-051671, for example, can be used as an actual method for calculating the colorimetric values of the color pattern CP.

The color adjustment in the image forming apparatus 100 can be performed alternatively with the RGB values of the color pattern CP that are obtained in the image capturing, as described above. In this case, the colorimetric camera 20 causes the sensor unit 25 to simultaneously capture the color pattern CP and the reference chart 40, and then performs, on the RGB values of the color pattern CP obtained from the captured image, a process of correcting errors due to a positional shift of the light source 28 and other factors by using the RGB values of the respective reference patches of the reference chart 40. The corrected RGB values of the color pattern CP are, for example, fed to the CPU 101 from the colorimetric camera 20 through the controlling FPGA 110. The CPU 101 then adjusts parameters and other items for use in control of ink ejection amounts of the recording heads 6 by using the corrected RGB values, so that the amounts of ink ejected from the recording heads 6 to the recording medium M are adjusted.

Configuration of Control Mechanism of Colorimetric Camera

Figure 10:
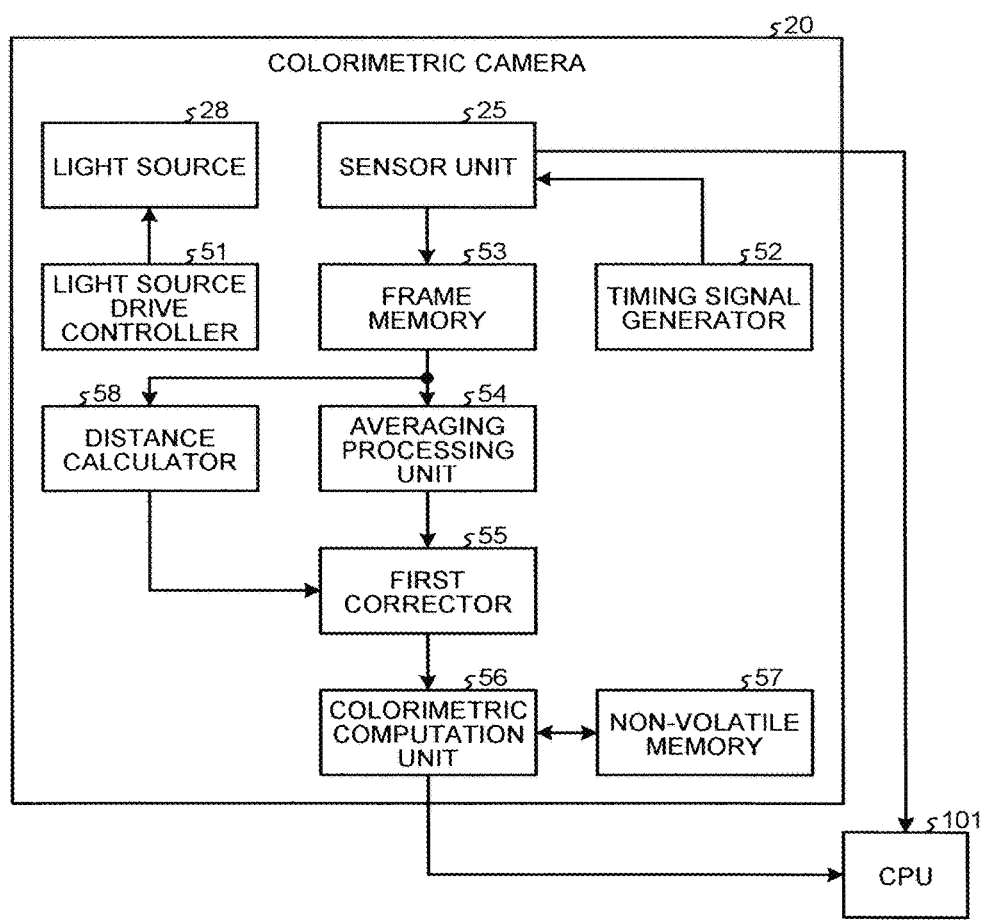
FIG. 10 is a block diagram illustrating an example functional configuration of the colorimetric camera.

Next, functions of the colorimetric camera 20 according to the present embodiment are described with reference to FIG. 10. FIG. 10 is a block diagram illustrating an example functional configuration of the colorimetric camera 20.

As illustrated in FIG. 10, the colorimetric camera 20 includes, in addition to the above-described sensor unit 25 and light sources 28, a light source drive controller 51, a timing signal generator 52, a frame memory 53, an averaging processing unit 54, a first corrector 55, a colorimetric computation unit 56, a non-volatile memory 57, and a distance calculator 58. Each of these units is implemented with the use of, for example, a computer system including a processor and a memory, or dedicated hardware such as an FPGA or an ASIC. Hardware that is used for implementing the functions of these units is, for example, mounted on the circuit board 24 arranged inside the casing 21 of the colorimetric camera 20.

The sensor unit 25 converts into electric signals, through the two-dimensional image sensor 25a, light incident thereto through the lens 25b, and outputs image data corresponding to an imaging range illuminated by the light sources 28. The sensor unit 25 has the built-in function of AD-converting, through the two-dimensional image sensor 25a, an analog signal obtained by photoelectric conversion into digital image data, performing various types of image processing such as shading correction, white balance correction, γ correction, and image data format conversion on the image data, and outputting the resulting image data. Various operating conditions of the two-dimensional image sensor 25a are set in accordance with various setting signals from the CPU 101. Part or the whole of the various types of image processing on the image data may be performed outside the sensor unit 25.

The light source drive controller 51 generates light source drive signals for turning on the light sources 28 and supplies the signals to the light sources 28 when the sensor unit 25 captures an image.

The timing signal generator 52 generates a timing signal that controls the timing when the sensor unit 25 starts capturing an image, and supplies the timing signal to the sensor unit 25.

The frame memory 53 temporarily stores therein an image output from the sensor unit 25.

In colorimetry on the color pattern CP, the averaging processing unit 54 extracts, from an image output from the sensor unit 25 and temporarily stored in the frame memory 53, an image region (this image region is hereinafter referred to as an "object image region") defined by the opening 23 of the casing 21 and an image region (this image region is hereinafter referred to as a "reference chart image region") having an image of the reference chart 40. The averaging processing unit 54 then averages image data of a previously determined size of a central region of the object image region, and outputs the resultant values as the RGB values of the color pattern CP. The averaging processing unit 54 also averages image data of regions corresponding to the respective reference patches within the reference chart image region, and outputs the resultant values as the RGB values of the respective reference patches. The RGB values of the color pattern CP are passed on to the colorimetric computation unit 56 after being corrected by the first corrector 55 in accordance with a distance calculated by the distance calculator 58. In contrast, the RGB values of the respective reference patches of the reference chart 40 are passed on to the colorimetric computation unit 56 without having been corrected by the first corrector 55.

Based on the distance between the casing 21 and the object outside the casing 21 that has been calculated by the distance calculator 58, the first corrector 55 corrects the RGB values of the color pattern CP output from the averaging processing unit 54. The above distance is, more specifically, the distance (the size of the gap d illustrated in FIG. 6 and FIG. 7) between the bottom plate part 21a of the casing 21 and a paper surface of the recording medium M that has the color pattern CP formed thereon. As described above, a change in the distance between the casing 21 and the object outside the casing 21 results in a change in intensity of light from light sources 28 with which the object is irradiated, which further changes the RGB values of the object obtained from image capturing. Given this situation, the colorimetric camera 20 according to the present embodiment is configured to calculate the distance between the casing 21 and the object outside the casing 21 through the distance calculator 58, and correct, in accordance with the calculated distance, the RGB values of the color pattern CP output from the averaging processing unit 54. The colorimetric camera 20 is thus enabled to stably obtain the RGB values of the color pattern CP and correctly calculate colorimetric values of the color pattern CP even when the above-described change in distance has occurred.

RGB values obtained for the object outside the casing 21 by capturing an image thereof approximately linearly change with the distance between the casing 21 and the object. That is, RGB values of the object decrease with increase in the distance between the casing 21 and the object because this increase decreases the intensity of light from the light sources 28 with which the object is irradiated. Therefore, correction amount calculation parameters for use in calculating correction amounts of the RGB values of the object from the distance between the casing 21 and the object may be obtained previously from an experiment or the like. The use of these correction amount calculation parameters enables the first corrector 55 to calculate the correction amounts according to the distance calculated by the distance calculator 58 and appropriately correct the RGB values of the color pattern CP output from the averaging processing unit 54. Alternatively, a correction table or a high-order function defining a correspondence relation between the distance between the casing 21 and the object and correction amounts for the RGB values may be obtained previously. The use of this correction table or high-order function enables the first corrector 55 to more accurately calculate the correction amounts according to the distance calculated by the distance calculator 58 and more highly accurately correct the RGB values of the color pattern CP output from the averaging processing unit 54. Details of a specific method for correcting the RGB values of the object in accordance with a change in the distance between the casing 21 and the object are disclosed in Japanese Patent Application Laid-open No. 2013-228370.

The colorimetric computation unit 56 calculates colorimetric values of the color pattern CP, based on the RGB values of the color pattern CP corrected by the first corrector 55 and the RGB values of the respective reference patches of the reference chart 40. The colorimetric values of the color pattern CP calculated by the colorimetric computation unit 56 are fed to the CPU 101 on the main control board 120. The colorimetric computation unit 56 can calculate the colorimetric values of the color pattern CP by a method disclosed in, for example, Japanese Patent Application Laid-open No. 2013-051671, and a detailed description of the processing by the colorimetric computation unit 56 is therefore omitted.

The non-volatile memory 57 stores therein, for example, various types of data needed by the colorimetric computation unit 56 for calculating colorimetric values of the color pattern CP.

The distance calculator 58 analyzes an image captured by the sensor unit 25 and temporarily stored in the frame memory 53 to calculate the distance between the casing 21 and the object outside the casing 21, more specifically, the distance (the size of the gap d illustrated in FIG. 6 and FIG. 7) between the bottom plate part 21a of the casing 21 and a paper surface of the recording medium M that has the color pattern CP formed thereon.

Figure 11:
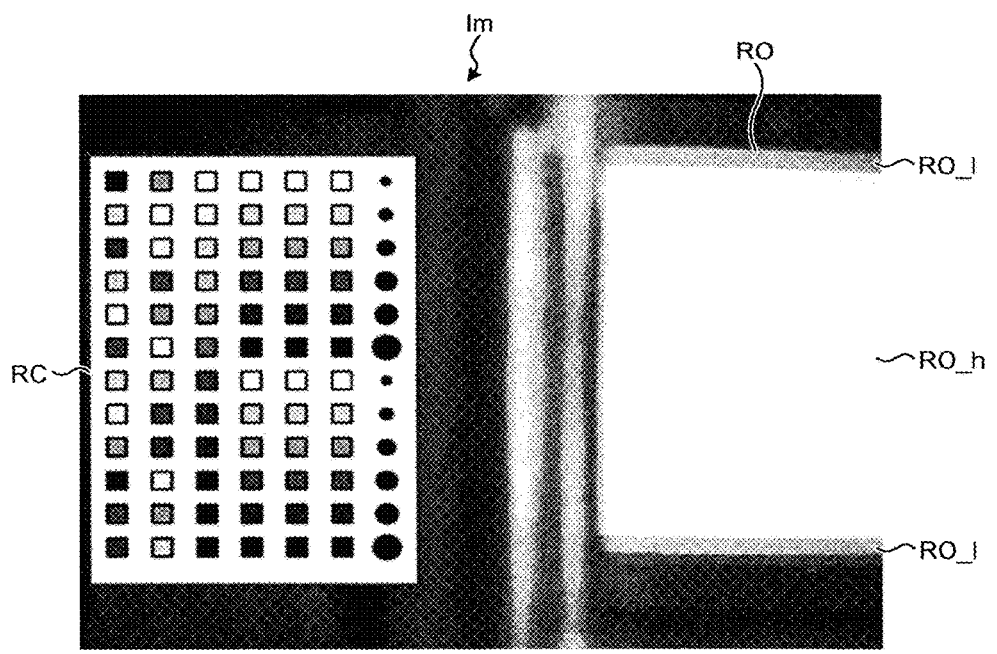
FIG. 11 is a view illustrating an example image captured by a sensor unit.
Figure 12:
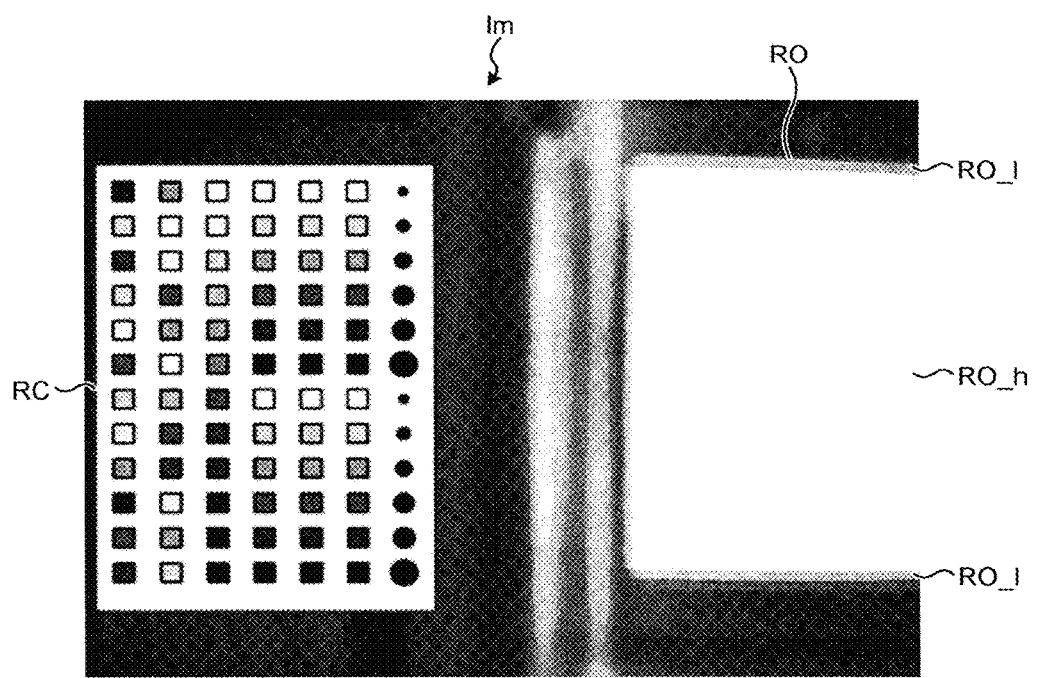
FIG. 12 is a view illustrating another example image captured by the sensor unit.
Figure 13:
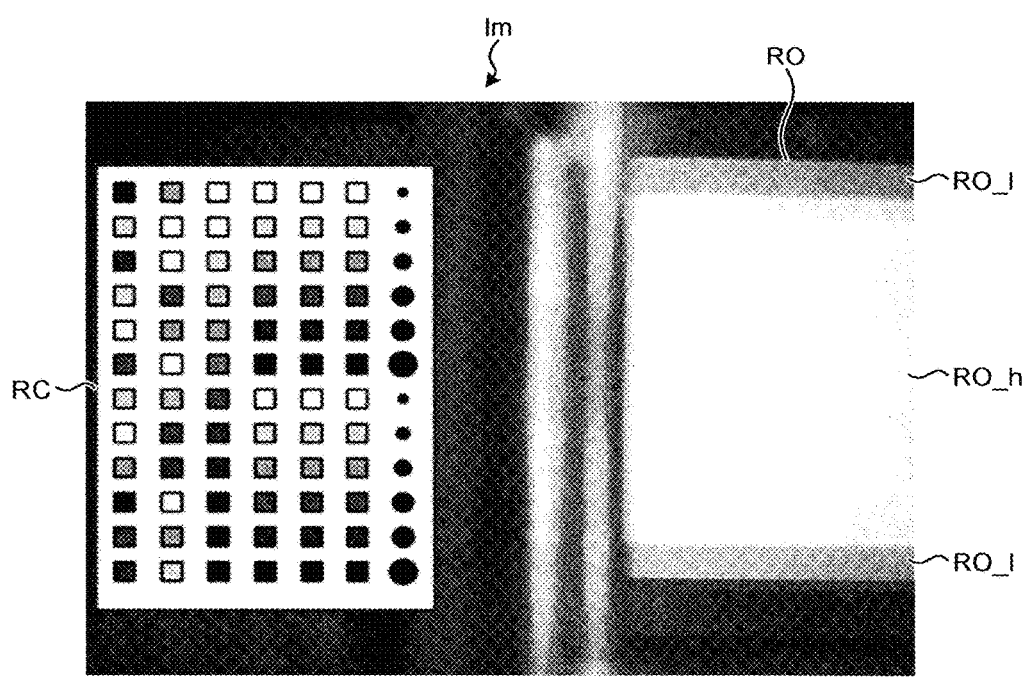
FIG. 13 is a view illustrating another example image captured by the sensor unit.

FIG. 11 to FIG. 13 are views illustrating example images captured by the sensor unit 25. FIG. 11 to FIG. 13 illustrate example images captured by the sensor unit 25 while a paper surface of the recording medium M not having the color pattern CP formed thereon is used as the object.

As illustrated in FIG. 11 to FIG. 13, each image Im captured by the sensor unit 25 contains a reference chart image region RC and an object image region RO. The reference chart image region RC is an image region having an image of the reference chart 40 inside the casing 21. The object image region RO is an image region having an image of an object outside the casing 21 through the opening 23 of the casing 21, that is, an image region defined by the opening 23 of the casing 21. The object image region RO is obtained as an image in which low-luminance regions RO_l indicating low luminance appear in belt-like shapes on outer sides of a high-luminance region RO_h indicating high luminance (outer sides in a direction perpendicular to a direction in which the reference chart 40 and the opening 23 are aligned next to each other, or the upper side and the lower side of the high-luminance region RO_h in the examples in FIG. 11 to FIG. 13).

In the image Im captured by the sensor unit 25, the reason why the low-luminance regions RO_l appear more outside than the high-luminance region RO_h in the object image region RO is that, because of different positional relations of the sensor unit 25 and the light sources 28 with the opening 23 of the casing 21, regions each not illuminated by one of the two light sources 28 appear in outside-facing parts of the imaging range for the object outside the casing 21 an image of which is captured by the sensor unit 25. Here, the size of the object image region RO in the image Im captured by the sensor unit 25 does not change because the sensor unit 25 and the light sources 28 are immovably provided to the casing 21 having the opening 23. However, the ratio of the size of the low-luminance regions RO_l in the object image region RO to the size of the high-luminance region RO_h therein changes with the distance between the casing 21 and the object outside the casing 21.

The image Im illustrated in FIG. 12 represents an example image captured by the sensor unit 25 with the distance between the casing 21 and the object (a paper surface of the recording medium M) outside the casing 21 being shorter than in the image Im illustrated in FIG. 11. As is apparent from comparison between the image Im illustrated in FIG. 12 and the image Im illustrated in FIG. 11, the ratio of the size of the low-luminance regions RO_l in the object image region RO to the size of the high-luminance region RO_h therein is smaller when the distance between the casing 21 and the object outside the casing 21 is shorter.

The image Im illustrated in FIG. 13 represents an example image captured by the sensor unit 25 with the distance between the casing 21 and the object (a paper surface of the recording medium M) outside the casing 21 being longer than in the image Im illustrated in FIG. 11. As is apparent from comparison between the image Im illustrated in FIG. 13 and the image Im illustrated in FIG. 11, the ratio of the size of the low-luminance regions RO_l in the object image region RO to the size of the high-luminance region RO_h therein is larger when the distance between the casing 21 and the object outside the casing 21 is longer.

As described above, in the image Im captured by the sensor unit 25, the ratio of the size of the low-luminance regions RO_l in the object image region RO to the size of the high-luminance region RO_h therein takes a value depending on the distance between the casing 21 and the object outside the casing 21. Therefore, the distance between the casing 21 and the object outside the casing 21 can be calculated by obtaining the ratio of the size of the low-luminance regions RO_l in the object image region RO to the size of the high-luminance region RO_h therein.

The distance calculator 58 calculates the distance between the casing 21 and the object outside the casing 21 in the following manner, for example. Specifically, the distance calculator 58 extracts the object image region RO from the image Im captured by the sensor unit 25 and temporarily stored in the frame memory 53. The distance calculator 58 then, for example, performs binarization using a certain threshold on the extracted object image region RO, thereby generating a binarized image having white pixels in place of the high-luminance region RO_h and black pixels in place of the low-luminance regions RO_l in the extracted object image region RO.

Subsequently, the distance calculator 58 counts the number of white pixels and the number of black pixels in the generated binarized image in a direction perpendicular to the direction in which the reference chart image region RC and the object image region RO are aligned next to each other in the image Im, and calculates the ratio of the number of black pixels to the number of white pixels as the ratio of the size of the low-luminance regions RO_l to the size of the high-luminance region RO_h. In the colorimetric camera 20 according to the present embodiment, as described above, the two light sources 28 are arranged, uniformly with respect to the center of the lens 25b of the sensor unit 25, in the direction perpendicular to the direction in which the opening 23 and the reference chart 40 are aligned next to each other. For this reason, on condition that there is no relative tilt between the casing 21 and the object, more specifically, that the bottom plate part 21a of the casing 21 and the paper surface of the recording medium M having the color pattern CP formed thereon are maintained parallel to each other, the low-luminance regions RO_l in the object image region RO appear in the same size on the opposite sides of the high-luminance region RO_h in the direction perpendicular to the direction in which the reference chart image region RC and the object image region RO are aligned next to each other in the image Im. Therefore, counting of the number of white pixels and the number of black pixels may be performed only for half the size of the object image region RO, that is, from the center of the object image region RO in a direction toward one of the low-luminance regions RO_l.

After thus calculating the ratio of the size of the low-luminance regions RO_l in the object image region RO to the size of the high-luminance region RO_h therein, the distance calculator 58 calculates, based on the obtained ratio, the distance between the casing 21 and the object outside the casing 21. Three options are considered, depending on the positional relation of the opening 23 of the casing 21 with the light sources 28, as a method for calculating the distance between the casing 21 and the object outside the casing 21 based on the ratio of the size of the low-luminance regions RO_l to the size of the high-luminance region RO_h. These three calculation methods are individually described below.

Distance Calculation Method 1

Figure 14:
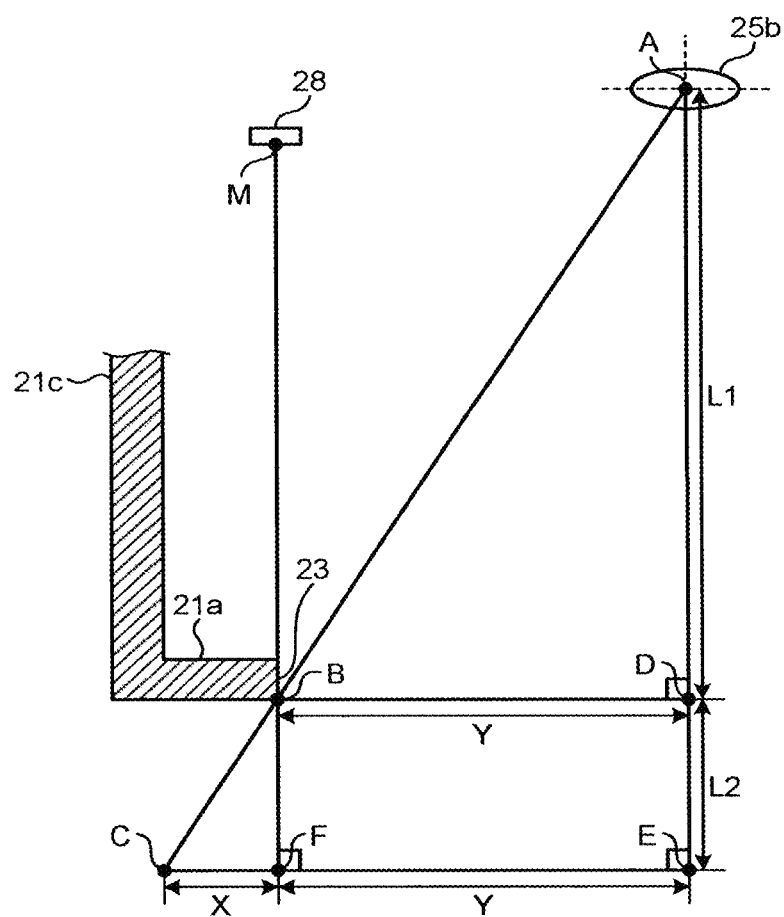
FIG. 14 is a diagram explaining a method for calculating a distance based on the ratio of the size of a low-luminance region to the size of a high-luminance region.

FIG. 14 is a diagram explaining a method for calculating the distance between the casing 21 and the object outside the casing 21 based on the ratio of the size of the low-luminance regions RO_l to the size of the high-luminance region RO_h, and illustrates a case where each of the light sources 28 is mounted on the circuit board 24 in a state positioned immediately above an edge portion of the opening 23.

As illustrated in FIG. 14, the position of the light source 28 is denoted as M; the center position of the lens 25b of the sensor unit 25 as A; the position of the lower edge of the opening 23 as B; the intersection of the extended line of a line segment AB with the object as C; the intersection of a straight line drawn toward the object from the center position A of the lens 25b perpendicularly to the object (the optical axis of the sensor unit 25) with a line that passes through the position B of the lower edge of the opening 23 and is parallel to the object as D; the intersection of the extended line of a line segment AD with the object as E; and the intersection of a straight line drawn from the position M of the light source 28 and passing through the position B of the lower edge of the opening 23 with the object as F. In this case, if the length of the line segment AD and the length of the line segment DE are denoted as L1 and L2, respectively, L2 is the distance between the casing 21 and the object, which is a length desired to be obtained. If the length of the line segment CF and the length of the line segment FE are denoted as X and Y, respectively, X/Y corresponds to the ratio of the size of the low-luminance regions RO_l to the size of the high-luminance region RO_h.

As is apparent from FIG. 14, the value of Y remains unchanged and equals to the length of the line segment BD whether or not the value of L2, or the distance between the casing 21 and the object, changes. In contrast, the value of X changes in such a manner as to be smaller when the value of L2 is smaller and be larger when the value of L2 is larger. Therefore, the value of L2, or the distance between the casing 21 and the object, can be found by finding X/Y, or the ratio of the size of the low-luminance regions RO_l to the size of the high-luminance region RO_h.

In FIG. 14, X:L2=Y:L1 because a right-angled triangle BCF and a right-angled triangle ABD are homologous with each other. This implies that X×L1=L2×Y, which can be transformed into X/Y=L2/L1. Here, the value of L1 is an invariable value determined by a position at which the sensor unit 25 is installed. Therefore, the value of L2, or the distance between the casing 21 and the object, can be found by finding X/Y, or the ratio of the size of the low-luminance regions RO_l to the size of the high-luminance region RO_h.

Distance Calculation Method 2

Figure 15:
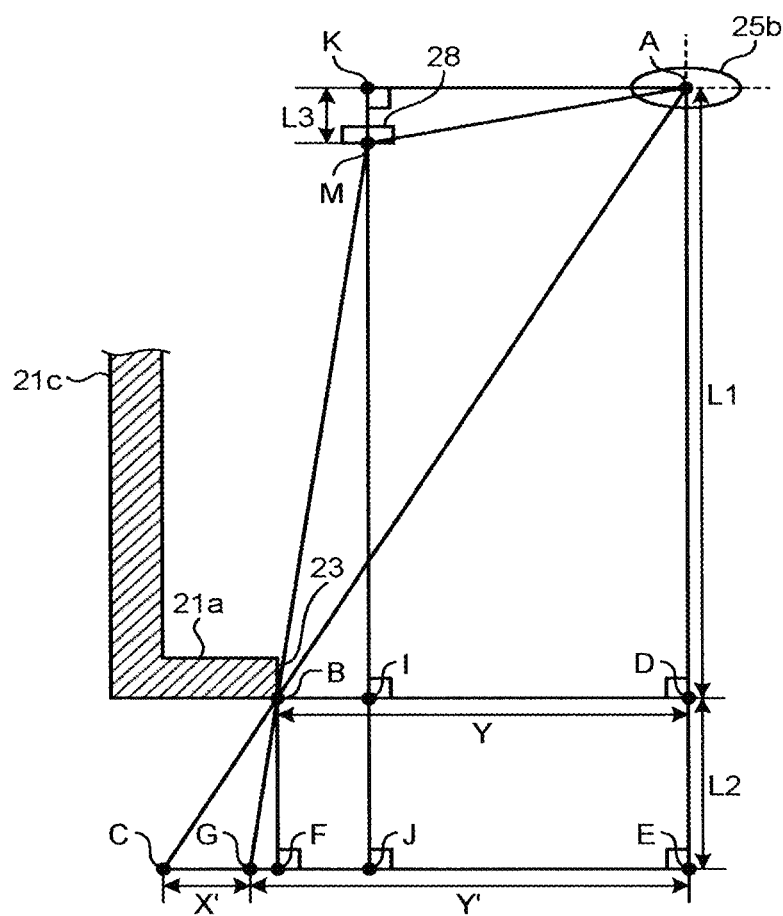
FIG. 15 is a diagram explaining the method for calculating a distance based on the ratio of the size of a low-luminance region to the size of a high-luminance region.

FIG. 15 is a diagram explaining another method for calculating the distance between the casing 21 and the object outside the casing 21 based on the ratio of the size of the low-luminance regions RO_l to the size of the high-luminance region RO_h, and illustrates a case where each of the light sources 28 is mounted on the circuit board 24 in a state displaced toward the lens 25b of the sensor unit 25 from a position immediately above an edge portion of the opening 23.

As illustrated in FIG. 15, the position of the light source 28 is denoted as M; the center position of the lens 25b of the sensor unit 25 as A; the position of the lower edge of the opening 23 as B; the intersection of the extended line of a line segment AB with the object as C; the intersection of a straight line drawn toward the object from the center position A of the lens 25b perpendicularly to the object (the optical axis of the sensor unit 25) with a straight line that passes through the position B of the lower edge of the opening 23 and is parallel to the object as D; the intersection of the extended line of a line segment AD with the object as E; the intersection of a straight line drawn toward the object from the position B of the lower edge of the opening 23 perpendicularly to the object with the object as F; the intersection of a straight line drawn from the light source 28 and passing through the position B of the lower edge of the opening 23 with the object as G; the intersection of a straight line drawn toward a line segment BD from the position M of the light source 28 perpendicularly to the line segment BD with the line segment BD as I; the intersection of the extended line of a line segment MI with a line segment FE as J; and the intersection of a straight line that passes through the center position A of the lens 25b and is parallel to the line segment BD with the extended line of a line segment IM as K. In this case, if the length of the line segment AD, the length of a line segment DE, and the length of the line segment KM are denoted as L1, L2, and L3, respectively, L2 is the distance between the casing 21 and the object, which is a length desired to be obtained. If the length of a line segment CG and the length of a line segment GE are denoted as X' and Y', respectively, X'/Y' corresponds to the ratio of the size of the low-luminance regions RO_l to the size of the high-luminance region RO_h.

As is apparent from FIG. 15, when the value of L2, or the distance between the casing 21 and the object, is 0, the value of X' is 0, and the value of Y' is Y, which is equal to the length of the line segment BD. In addition, when the value of L2 is increased, the value of X' increases in proportion to the increase of the value of L2, and the value of Y' also increases in proportion thereto. Therefore, the value of L2, or the distance between the casing 21 and the object, can be found by finding X'/Y', or the ratio of the size of the low-luminance regions RO_l to the size of the high-luminance region RO_h.

In FIG. 15, the length of a line segment GF is denoted as k. Here, (X'+k):L2=Y:L1 because a right-angled triangle BCF and a right-angled triangle ABD are homologous with each other. Therefore, the relation can be expressed as X'=(Y×L2/L1)−k. At the same time, Y'=Y+k.

Here, the value of k is desired to be obtained. The length of a line segment BI is denoted as m. In this case, m:(L1−L3)=k:L2 because a right-angled triangle MBI and a right-angled triangle BGF are homologous with each other. Therefore, the relation can be expressed as k=L2×m/(L1−L3). Here, m/(L1−L3) is a constant that is uniquely determined by layout. If this constant, m/(L1−L3) is denoted as α, the relation can be expressed as k=α×L2.

Therefore, X'=(Y×L2/L1)−α×L2 and Y'=Y+α×L2 are obtained. X'=(Y×L2/L1)−α×L2 can be transformed into another expression X'=L2((Y/L1)−α). Here, Y/L1 is also a constant that is uniquely determined by layout. Therefore, if Y/L1 is denoted as β, the equation can be also expressed as X'=L2(β−α).

X'/Y'=L2(β−α)/Y+α×L2 is thus obtained. As described above, α=m/(L1−L3) and β=Y/L1 are constants that are uniquely determined by layout, individually. Therefore, the value of L2, or the distance between the casing 21 and the object, can be found by finding X'/Y', or the ratio of the size of the low-luminance regions RO_l to the size of the high-luminance region RO_h.

Distance Calculation Method 3

Figure 16:
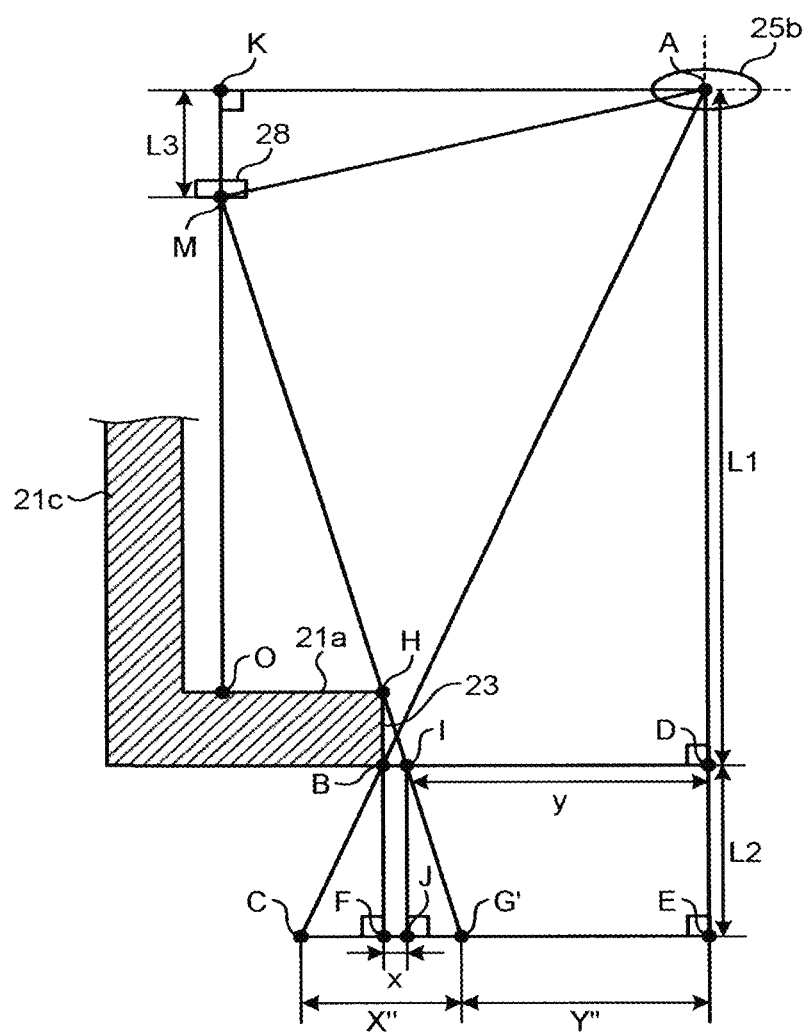
FIG. 16 is a diagram explaining the method for calculating a distance based on the ratio of the size of a low-luminance region to the size of a high-luminance region.

FIG. 16 is a diagram explaining another method for calculating the distance between the casing 21 and the object outside the casing 21 based on the ratio of the size of the low-luminance regions RO_l to the size of the high-luminance region RO_h, and illustrates a case where each of the light sources 28 is mounted on the circuit board 24 in a state displaced toward the side wall part 21c from a position immediately above an edge portion of the opening 23.

As illustrated in FIG. 16, the position of the light source 28 is denoted as M; the center position of the lens 25b of the sensor unit 25 as A; the position of the lower edge of the opening 23 as B; the position of the upper edge of the opening 23 as H; the intersection of the extended line of a line segment AB with the object as C; the intersection of a straight line drawn toward the object from the center position A of the lens 25b perpendicularly to the object (the optical axis of the sensor unit 25) with a line that passes through the position B of the lower edge of the opening 23 and is parallel to the object as D; the intersection of the extended line of a line segment AD with the object as E; the intersection of a straight line drawn toward the object from the position B of the lower edge of the opening 23 perpendicularly to the object with the object as F; the intersection of a straight line drawn from the position M of the light source 28 and passing through the position H of the upper edge of the opening 23 with the object as G'; the intersection of a line segment HG' with a line segment BD as I; the intersection of a straight line drawn toward the object from the intersection I perpendicularly to the object with the object as J; the intersection of a straight line drawn toward the bottom plate part 21a of the casing 21 from the position M of the light source 28 perpendicularly to the bottom plate part 21a with the bottom plate part 21a as O; and the intersection of a straight line that passes through the center position A of the lens 25b and is parallel to the line segment BD with the extended line of a line segment OM as K. In this case, if the length of the line segment AD and the length of a line segment DE are denoted as L1 and L2, respectively, L2 is the distance between the casing 21 and the object, which is a length desired to be obtained. If the length of a line segment BI and the length of a line segment ID are denoted as x and y, respectively, while the length of a line segment CG' and the length of a line segment G'E are denoted as X" and Y", respectively, X"/Y" corresponds to the ratio of the size of the low-luminance regions RO_l to the size of the high-luminance region RO_h.

As is apparent from FIG. 16, when the value of L2, or the distance between the casing 21 and the object, is 0, the value of X" is x, and the value of Y" is y. In addition, the value of X" increases from x in proportion to an increase of the value of L2, and the value of Y" increases from y in proportion thereto. Therefore, the value of L2, or the distance between the casing 21 and the object, can be found by finding X"/Y", or the ratio of the size of the low-luminance regions RO_l to the size of the high-luminance region RO_h.

The size of x is desired to be obtained in the first place. In FIG. 16, the length of a line segment HB (the thickness of the bottom plate part 21a), the length of a line segment MO, and the length of a line segment OH are denoted as a, b, and c. In this case, (L1−L3−a):a=c:x because a right-angled triangle MOH and a right-angled triangle HBI are homologous with each other. Therefore, the relation can be expressed as x=a×c/(L1−L3−a). Here, X"=x and Y"=y when L2=0. Therefore, if the length of the line segment BD is denoted as d, X"/Y"=x/y={a×c/(L1−L3−a)}/{d−a×c/(L1−L3−a)} is obtained. Here, {a×c/(L1−L3−a)}/{d−a×c/(L1−L3−a)} is an invariable value because the values of L1, L3, a, b, c, and d are values that are determined by layout. Therefore, when X"/Y", or the ratio of the size of the low-luminance regions RO_l to the size of the high-luminance region RO_h, takes this value, it is found that L2=0.

The size of a line segment CF and the size of a line segment FG' are desired to be obtained next. In FIG. 16, the length of the line segment CF and the length of the line segment FG' are denoted as e and f, respectively. In this case, L1:d=L2:e because a right-angled triangle ABD and a right-angled triangle BCF are homologous with each other. Therefore, the relation can be expressed as e=d×L2/L1. In addition, a:x=L2:(f−x) because a right-angled triangle HBI and a right-angled triangle IJG' are homologous with each other. Therefore, the relation can be expressed as f=x×(a+L2)/a.

Here, CG'=CF+FG' holds, and the foregoing relation can be expressed as X"=d×L2/L1+x×(a+L2)/a=L2×(d/L1+x/a)+x. Here, (d/L1+x/a) is a constant that is uniquely determined by layout. If this constant, (d/L1+x/a), is denoted as α, the relation can be expressed as X"=L2×α+x.

Furthermore, in relation to obtaining the value of (X"+Y"), d:L1=(X"+Y"):(L1+L2) because a right-angled triangle ABD and a right-angled triangle ACE are homologous with each other. Therefore, the relation can be expressed as X"+Y"=d×(L1+L2)/L1=L2×d/L1+d. Here, d/L1 is a constant that is uniquely determined by layout. If this constant, d/L1, is denoted as β, the relation can be expressed as X"+Y"=L2×β+d. Therefore, the relation can be expressed as Y"=L2×β+d−X"=L2×β+d−(L2×α+x).

X"/Y"=(L2×α+x)/{L2×β+d−(L2×α+x)} is thus obtained. Here, α=d/L1+x/a and β=d/L1 are, as described above, constants that are uniquely determined by layout, individually. The value of x and the value of d are also values that are uniquely determined by layout. Therefore, the value of L2, or the distance between the casing 21 and the object, can be found by finding X"/Y", or the ratio of the size of the low-luminance regions RO_l to the size of the high-luminance region RO_h.

Other Methods

The above descriptions assume that the distance between the casing 21 and the object outside the casing 21 is calculated based on the ratio of the size of the low-luminance regions RO_l in the object image region RO to the size of the high-luminance region RO_h therein. However, the size of the low-luminance regions RO_l and the size of the high-luminance region RO_h linearly change (in the example in the FIG. 14, only the size of the low-luminance regions RO_l changes) with the distance between the casing 21 and the object, as described above. For this reason, a correspondence table indicating the relation of the size of the low-luminance regions RO_l or of the high-luminance region RO_h with the distance between the casing 21 and the object may be previously produced, and the distance between the casing 21 and the object may be calculated by use of this correspondence table.

In this case, the above correspondence table is produced in such a manner that: images are captured through the sensor unit 25 with the distance between the casing 21 and the object being sequentially changed; and the size of the low-luminance regions RO_l or of the high-luminance region RO_h obtained by analyzing the captured images are associated with the distance between the casing 21 and the object at the time of capturing each of the images. The correspondence table is stored in the non-volatile memory 57 (an example of a first table retaining unit) or the like. Thereafter, when calculating the distance between the casing 21 and the object, the distance calculator 58 acquires the size of the low-luminance regions RO_l or of the high-luminance region RO_h by analyzing an image captured by the sensor unit 25, and calculates, with reference to the correspondence table retained by the non-volatile memory 57, the distance between the casing 21 and the object that corresponds to the acquired size of the low-luminance regions RO_l or of the high-luminance region RO_h.

The distance between the casing 21 and the object calculated by the distance calculator 58 is, as described above, passed on to the first corrector 55 and used in the first corrector 55 for correcting the RGB values (color information on the high-luminance region RO_h) of the color pattern CP. Inconveniences such as instability of the RGB values of the color pattern CP due to changes in the distance between the casing 21 and the object are thus eliminated, so that highly accurate colorimetry can be carried out.

Operation

Figure 17:
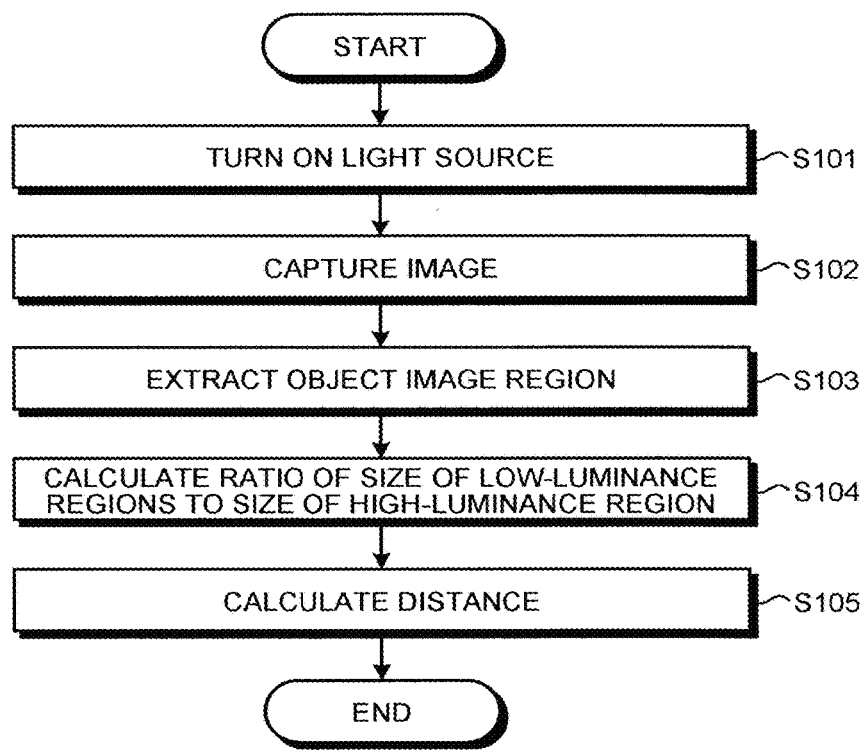
FIG. 17 is a flowchart illustrating the procedure of distance measurement that the colorimetric camera performs.

Distance measuring operation that the colorimetric camera 20 according to the present embodiment performs is briefly described next. FIG. 17 is a flowchart illustrating the procedure of distance measurement that the colorimetric camera 20 according to the present embodiment performs.

When the distance between the casing 21 and the object outside the casing 21 is measured, the colorimetric camera 20 according to the present embodiment first causes the light source drive controllers 51 to turn on the light sources 28

(Step S101). The sensor unit 25 then captures an image with the light sources 28 on (Step S102). An image Im captured by the sensor unit 25 and output from the sensor unit 25 is stored in the frame memory 53.

Subsequently, the distance calculator 58 extracts the object image region RO from the image Im captured by the sensor unit 25 and stored in the frame memory 53 (Step S103). The distance calculator 58 then calculates the ratio of the size of the low-luminance regions RO_l to the size of the high-luminance region RO_h, for example, by performing processing such as binarization on the extracted object image region RO and counting of the number of black pixels and the number of white pixels (Step S104). The distance calculator 58 then calculates the distance between the casing 21 and the object based on the calculated ratio (Step S105), and passes on the calculated distance to the first corrector 55. This ends the distance measuring operation of the colorimetric camera 20 according to the present embodiment.

Advantageous Effects of Embodiment

As described above in detail with specific examples given, the colorimetric camera 20 according to the present embodiment is configured to calculate the distance between the casing 21 and the object outside the casing 21 based on the ratio of the size of the low-luminance regions RO_l in the object image region RO contained in the image Im captured by the sensor unit 25 to the size of the high-luminance region RO_h therein. The need for providing a mark portion for distance measurement on the light-permeable member as is done in conventional techniques is thus eliminated, and the distance between the casing 21 and the object can be measured easily and conveniently.

The colorimetric camera 20 according to the present embodiment is further configured to correct, in accordance with the calculated distance, the RGB values of the color pattern CP obtained from image capturing by the sensor unit 25. The inconvenience of instability of the RGB values of the color pattern CP due to changes in the distance between the casing 21 and the object thus can be effectively prevented. The colorimetric camera 20 according to the present embodiment is further configured to calculate, based on the RGB values of the color pattern CP corrected in accordance with the calculated distance, colorimetric values of the color pattern CP. Colorimetry for the color pattern CP thus can be highly accurately performed.

In the image forming apparatus 100 according to the present embodiment, color adjustment in which the ejection amounts of ink to be ejected onto the recording medium M from the recording heads 6 are adjusted by use of colorimetric values of the color pattern CP calculated by the colorimetric camera 20 according to the present embodiment, or the RGB values of the color pattern CP. Thus, images can be recorded with high reproducibility through appropriate color adjustment.

Modifications

The above embodiment assumes that the casing 21 of the colorimetric camera 20 and the object are kept not tilting relatively to each other. However, for example, a margin of error in the attachment of the colorimetric camera 20, a certain condition of the recording medium M, or the like may sometimes prevent the object from being parallel (horizontal) with the bottom plate part 21a of the casing 21 of the colorimetric camera 20 and cause a relative tilt therebetween. In this case, the intensity of light from the light sources 28 with which the object is irradiated changes in accordance with the tilt, so that the RGB values of the object obtained from image capturing change. Given this situation, the above-described colorimetric camera 20 may be provided additionally with the function of calculating the relative tilt between the casing 21 and the object. The colorimetric camera 20 may be further configured to correct the RGB values (color information on the high-luminance region RO_h) of the color pattern CP in accordance with the relative tilt between the casing 21 and the object.

Figure 18:
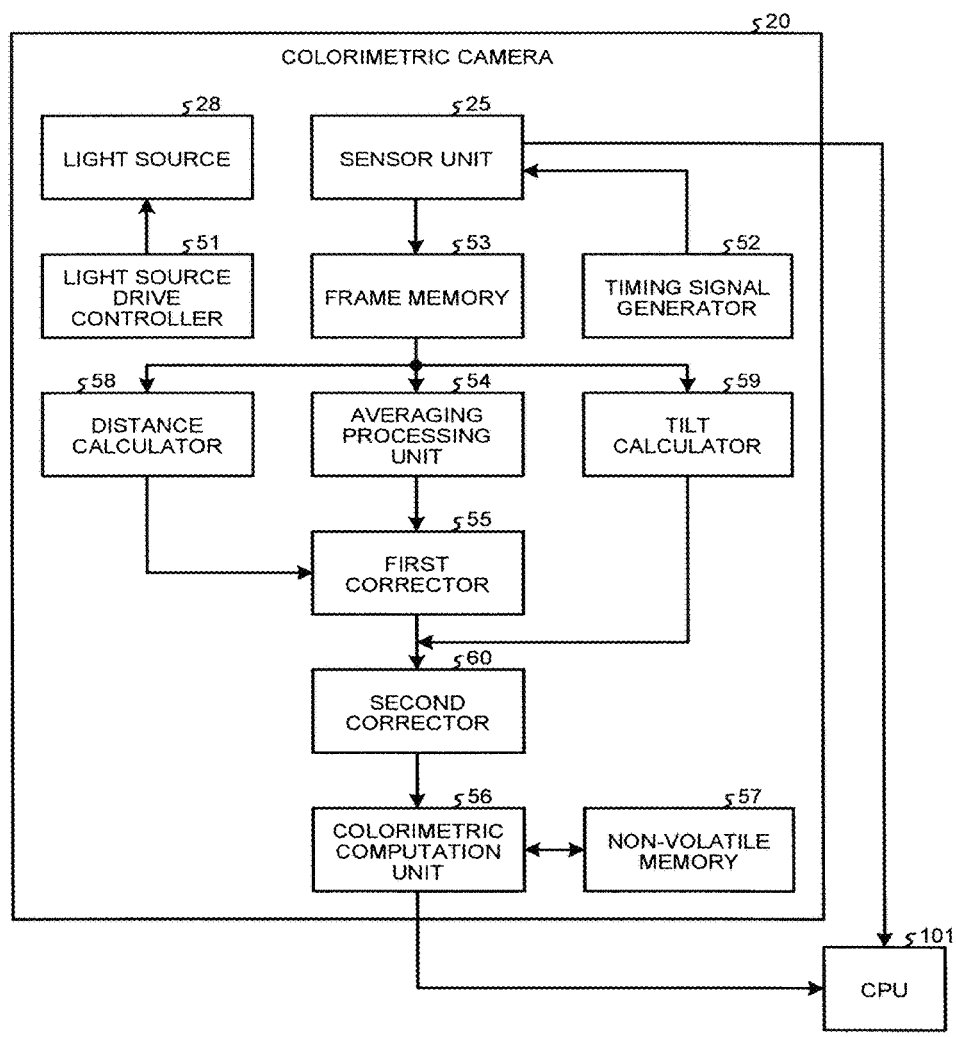
FIG. 18 is a block diagram illustrating an example functional configuration of a colorimetric camera according to a modification of the embodiment.

FIG. 18 is a block diagram illustrating a functional configuration example of the colorimetric camera 20 according to this modification. This configuration illustrated in FIG. 18 is obtained by adding a tilt calculator 59 and a second corrector 60 to the configuration illustrated in FIG. 10.

The tilt calculator 59 analyzes an image captured by the sensor unit 25 and temporarily stored in the frame memory 53 to calculate the relative tilt between the casing 21 and the object, more specifically, the tilt between the bottom plate part 21a of the casing 21 and a paper surface of the recording medium M that has the color pattern CP formed thereon.

The tilt calculator 59 extracts, from an image Im captured by the sensor unit 25 and temporarily stored in the frame memory 53, an object image region RO containing a high-luminance region RO_h and low-luminance regions RO_l, and generates a binarized image by performing binarization on the object image region RO, for example, as in the case of the distance calculator 58 described above. The tilt calculator 59 then counts, in the image Im, the numbers of black pixels appearing in the respective opposite ends of the binarized image in a direction perpendicular to a direction in which a reference chart image region RC and the object image region RO are aligned next to each other. If the difference between the counted numbers of black pixels in the respective opposite ends of the binarized image exceeds a certain threshold (that is, if the size of one of the low-luminance regions RO_l and the size of the other low-luminance region RO_l are significantly different from each other), the tilt calculator 59 determines that there is a relative tilt caused between the casing 21 and the object.

Upon determining that there is a relative tilt caused between the casing 21 and the object, the tilt calculator 59 further counts the number of white pixels in the above-described binarized image in the same direction as it has counted the numbers of black pixels, and calculates the ratio of the number of black pixels to the number of white pixels as the ratio of the size of the low-luminance regions RO_l to the size of the high-luminance region RO_h. The tilt calculator 59 then calculates the relative tilt between the casing 21 and the object based on the ratio of the size of the low-luminance regions RO_l in the object image region RO to the size of the high-luminance region RO_h therein. A specific example of a method for calculating the tilt from the ratio of the size of the low-luminance regions RO_l to the size of the high-luminance region RO_h is described later in detail.

After the tilt calculator 59 calculates the relative tilt between the casing 21 and the object, the second corrector 60 further corrects, in accordance with the calculated tilt, the RGB values of the color pattern CP that have been corrected by the first corrector 55. Correction amount calculation parameters for use in calculating correction amounts of the RGB values of the object from the size of the relative tilt between the casing 21 and the object may be obtained previously from an experiment or the like. The use of these correction amount calculation parameters enables the second corrector 60 to appropriately correct the RGB values of the color pattern CP. Alternatively, a correction table or a high-order function defining a correspondence relation between the size of the relative tilt between the casing 21 and the object and correction amounts for the RGB values may be obtained previously. The use of this correction table or high-order function enables the second corrector 60 to more accurately calculate the correction amounts according to the tilt calculated by the tilt calculator 59 and more highly accurately correct the RGB values of the color pattern CP.

Figure 19:
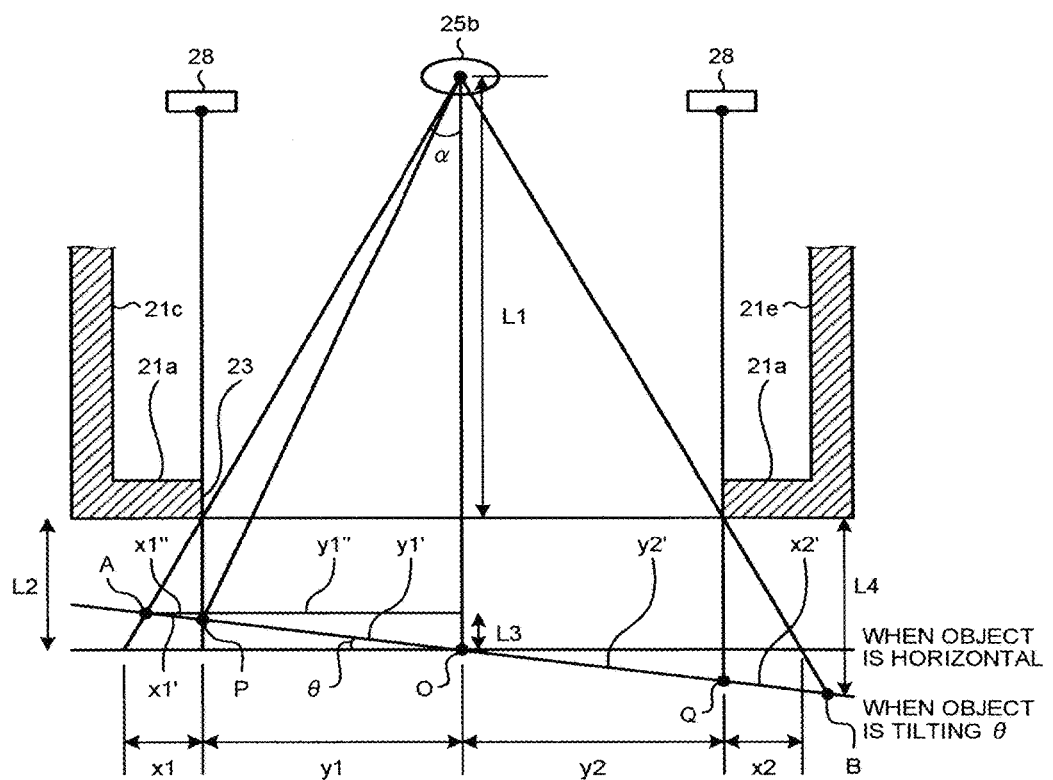
FIG. 19 is a diagram explaining a method for calculating a tilt based on the ratio of the size of a low-luminance region to the size of a high-luminance region.

A specific example of a method for calculating the tilt from the ratio of the size of the low-luminance regions RO_l to the size of the high-luminance region RO_h is described with reference to FIG. 19. FIG. 19 illustrates a case where, with each of the light sources 28 mounted on the circuit board 24 in a state positioned immediately above an edge portion of the opening 23 as in the case illustrated in FIG. 14, the object tilts θ degrees from the bottom surface part 21*a* of the casing 21.

When the object is horizontal (parallel with the bottom surface part 21*a* of the casing 21), the value of L2, or the distance between the casing 21 and the object, can be obtained by the Distance Calculation Method 1. In contrast, when the object tilts θ degrees from the bottom surface part 21*a* of the casing 21, L2 in FIG. 19 is the average of a distance L3 calculated based on the size of one of the two low-luminance regions RO_l and a distance L4 calculated based on the size of the other low-luminance region RO_l under the assumption that the object has linearity in the imaging range, as expressed by Mathematical Formula (1):

$$L2=(L3+L4)/2 \tag{1}$$

Here, in FIG. 19, the ranges of the low-luminance regions RO_l and ranges of the high-luminance region RO_h when the object is horizontal with respect to the bottom surface part 21*a* of the casing 21 are denoted as x1, x2, y1, and y2, respectively; and the ranges of the low-luminance regions RO_l (a line segment AP and a line segment QB in FIG. 19) and ranges of the high-luminance region RO_h (a line segment PO and a line segment OQ) when the object tilts θ degrees from the bottom surface part 21*a* of the casing 21 are denoted as x1', x2', y1', and y2', respectively.

In FIG. 19, a line with a slope α that is drawn from the center of the lens 25*b* and passes through the position of a lower edge of the opening 23 in the left-hand side of the illustration can be expressed by Mathematical Formula (2):

$$y=(L1/y1)\times(L1+L2) \tag{2}$$

where the intersection of a perpendicular line drawn toward the bottom surface part 21*a* of the casing 21 from the center of the lens 25*b* of the sensor unit 25 perpendicularly to the bottom surface part 21*a* with the object is set as the origin O; the leftward and rightward directions in the illustration are set as direction of x; and upward and downward directions are set as directions of y.

In addition, a line with a slope θ that passes through the origin O can be expressed by Mathematical Formula (3):

$$y=-\tan\theta\times x \tag{3}$$

The intersection A(x,y) can be obtained by solving Mathematical Formula (2) and Mathematical Formula (3) given above. The y coordinate A(y) of this intersection A is the distance L3. Let us consider a line that passes through this intersection A and is parallel to the bottom surface part 21*a* of the casing 21. If the range of the low-luminance region RO_l and the range of the high-luminance region RO_h are denoted as x1" and y1", respectively, x1" and y1" can be expressed by Mathematical Formula (4):

$$x1"=|A(x)|-|y1| \text{ and } y1"=y1 \tag{4}$$

With x1" and y1" in Mathematical Formula (4) given above and θ, the above variables x1' and y1' can be obtained as Mathematical Formula (5):

$$x1'=x1"/\cos\theta, \text{ and } y1'=y1"/\cos f \tag{5}$$

From Mathematical Formula (4) and Mathematical Formula (5) given above, x1' and y1' can be expressed by Mathematical Formula (6):

$$x1'=(|A(x)|-|y1|)/\cos\theta \text{ and } y1'=y1/\cos\theta \tag{6}$$

From Mathematical Formula (6) given above, the apparent ratio (x1':y1'=line segment AP: line segment PO) of the low-luminance region RO_l to the high-luminance region RO_h in the image can be expressed by Mathematical Formula (7):

$$x1':y1'=(|A(x)|-|y1|)/\cos\theta:y1/\cos\theta \tag{7}$$

Here, A(x) is a function of θ obtained by Mathematical Formula (2) and Mathematical Formula (3) given above, so that θ can be obtained by finding x1':y1'. When θ is sufficiently small, approximations of A(x)=x1+y1 and B(x)=x2+y2 are possible. Therefore, the processes for obtainment from the intersection with Mathematical Formula (2) can be simplified.

In the foregoing descriptions, the relative tilt between the casing 21 and the object is calculated based on the ratio of the size of the low-luminance region RO_l in the object image region RO to a size of the high-luminance region RO_h therein. However, a correspondence table indicating the relation of the sizes of the low-luminance regions RO_l or the high-luminance region RO_h with the relative tilt between the casing 21 and the object may be previously produced, and the relative tilt between the casing 21 and the object may be calculated by use of this correspondence table.

In this case, the above correspondence table is produced in such a manner that: images are captured through the sensor unit 25 with the distance between the casing 21 and the object being sequentially changed and with the relative tilt between the casing 21 and the object being sequentially changed with respect to each distance therebetween; and the size of the low-luminance regions RO_l or of the high-luminance region RO_h obtained by analyzing the captured images is associated with the relative tilt between the casing 21 and the object at the time of capturing each of the images. The correspondence table is stored in the non-volatile memory 57 (an example of a second table retaining unit) or the like. Thereafter, when calculating the relative tilt between the casing 21 and the object, the tilt calculator 59 acquires the size of the low-luminance regions RO_l or of the high-luminance region RO_h by analyzing an image captured by the sensor unit 25, and calculates, with reference to the correspondence table retained by the non-volatile memory 57, the relative tilt between the casing 21 and the object that corresponds to the acquired size of the low-luminance regions RO_l or of the high-luminance region RO_h.

The relative tilt between the casing 21 and the object calculated by the tilt calculator 59 is, as described above, passed on to the second corrector 60 and used in the second corrector 60 for correcting the RGB values (color information on the high-luminance region RO_h) for the color pattern CP. Inconveniences such as instability of the RGB values of the color pattern CP due to changes in the relative tilt between the casing 21 and the object are thus eliminated, so that highly accurate colorimetry can be carried out.

Although the colorimetric camera 20 has the function of calculating the colorimetric values of the colorimetric patterns CP in the above embodiment, the colorimetric values of the colorimetric patterns CP may be calculated outside the colorimetric camera 20. For example, the CPU 101 or the controlling FPGA 110 mounted on the main control board 120 of the image forming apparatus 100 can be configured to calculate the colorimetric values of the color pattern CP. In this case, the colorimetric camera 20 is configured to feed the RGB values of the color pattern CP obtained from image capturing by the sensor unit 25 and the RGB values of the respective reference patches included in the reference chart 40 to the CPU 101 or the controlling FPGA 110, instead of feeding thereto the colorimetric values of the color pattern CP. In other words, the colorimetric camera 20 is configured as an image capturing apparatus without the function of calculating colorimetric values.

Although the above embodiment illustrates the image forming apparatus 100 configured as a serial head type inkjet printer, the present invention is not limited to the above example and can be effectively applied to various types of image forming apparatuses. For example, when the present invention is applied to a line head type inkjet printer, a plurality of colorimetric cameras 20 may be arranged next to one another in a direction perpendicular to a conveyance direction of the recording medium M. Otherwise, when the present invention is applied to an electrophotographic image forming apparatus, a plurality of colorimetric cameras 20 may be arranged next to one another in a direction perpendicular to a conveyance direction of the recording medium M at any position in a conveyance path of the recording medium M through which the recording medium M is conveyed at least after fixation. In particular, in the case of performing colorimetry (acquisition of RGB values) on the color pattern CP using a plurality of colorimetric cameras 20 with the recording medium M being conveyed, it is desirable that the color pattern CP be formed as a patch having a shape elongated in the conveyance direction of the rerecording medium M.

Figure 20:
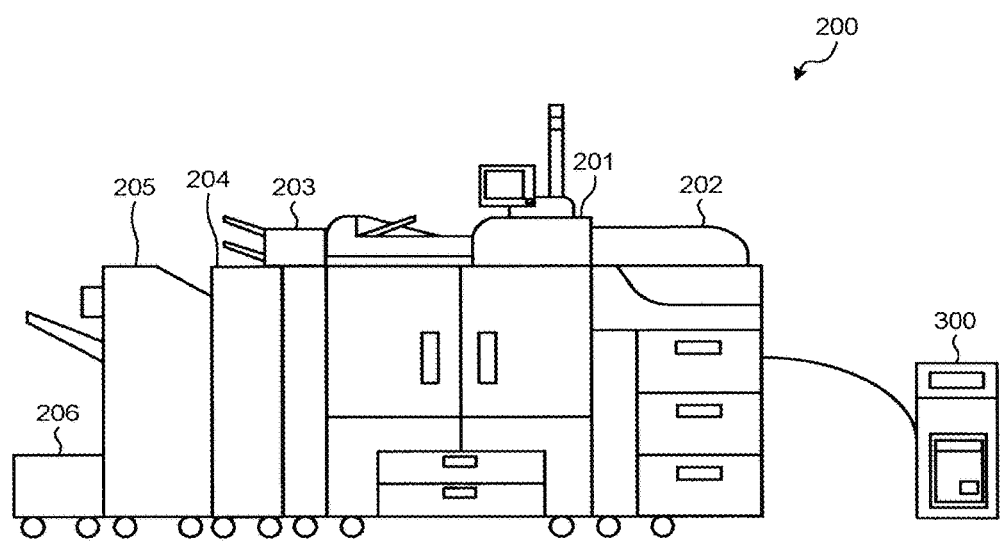
FIG. 20 is an external view of an electrophotographic image forming apparatus configured as a production printer.

FIG. 20 is an external view of an electrophotographic image forming apparatus 200 configured as a production printer. The image forming apparatus 200 illustrated in FIG. 20 includes a main body unit 201 that electrophotographically forms images on recording media M by using toner as color material. The image forming apparatus 200 has a configuration obtained by combining peripheral equipment with this main body unit 201 in accordance with the intended purpose. The peripheral equipment includes, for example, a large-capacity paper feeding unit 202 that feeds paper, an inserter 203 that is used for feeding cover sheets, a folding unit 204 that applies a folding process to recording media M on which images have been formed, a finisher 205 that performs stapling, punching, and the like, and a cutting machine 206 that performs cutting. An external controller 300 called a digital front end (DFE) is connected to this image forming apparatus 200.

Figure 21:
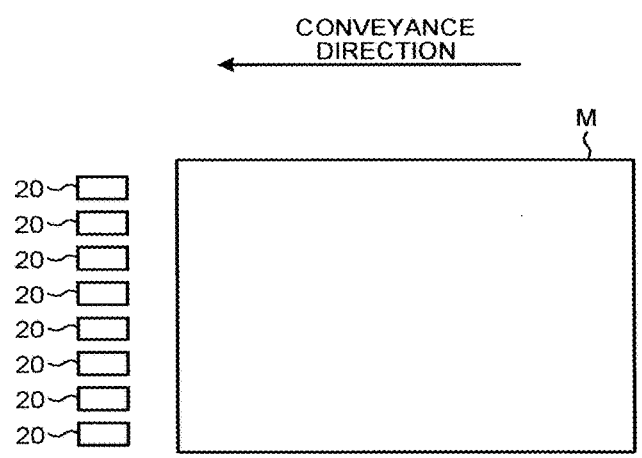
FIG. 21 is a diagram explaining an example arrangement of colorimetric cameras in an electrophotographic image forming apparatus.

In the electrophotographic image forming apparatus 200 thus configured, a plurality of colorimetric cameras 20 are arranged, for example, in a conveyance path of recording media M inside the finisher 205 so as to be aligned next to one another in a direction perpendicular to a conveyance direction of recording media M. FIG. 21 is a diagram explaining an example of arrangement of the colorimetric cameras 20 in this case. In the example illustrated in FIG. 21, eight colorimetric cameras 20 are linearly arranged in a direction perpendicular to a conveyance direction of recording media M.

When the main body unit 201 conveys a recording medium M having the color pattern CP formed thereon, these colorimetric cameras 20 cause the sensor units 25 to capture images thereof at the timing when the color pattern CP arrives at positions facing the openings 23 provided in the casings 21, thereby acquiring RGB values of the color pattern CP, for example. The colorimetric cameras 20 then feed the RGB values of the color pattern CP acquired in the image capturing by the sensor units 25 or colorimetric values of the color pattern CP calculated based on these RGB values to the main body unit 201. In the main body unit 201, amounts of toner to be attached to the recording medium M are adjusted (colors are adjusted) by use of the RGB values of the color pattern CP or the colorimetric values of the color pattern CP that have been fed from the colorimetric cameras 20. In the case of a configuration in which recording media M need to be sufficiently cooled inside the main body unit 201 after fixing, the colorimetric cameras 20 are arranged, in a conveyance path of recording media M inside the main body unit 201 after the cooling, next to one another in a direction perpendicular to a conveyance direction of recording media M.

Figure 22:
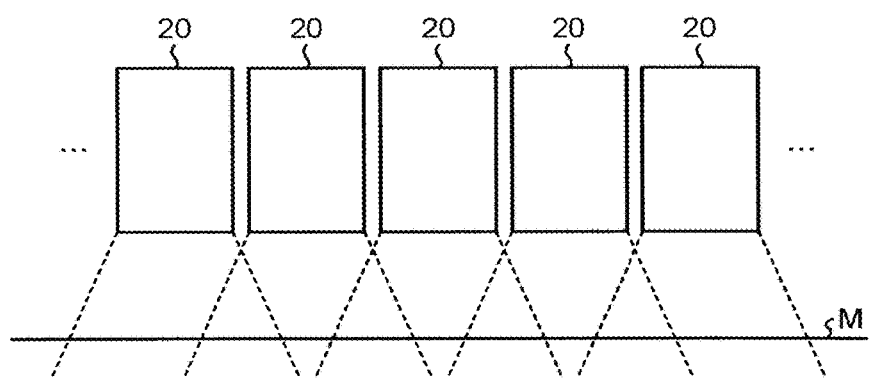
FIG. 22 is a diagram explaining disadvantages involved when a plurality of colorimetric cameras simultaneously calculate distances or tilts.

In a case where a plurality of colorimetric cameras 20 are linearly arranged next to one another in a direction perpendicular to a conveyance direction of recording media M as illustrated in FIG. 21, light from the light sources 28 of adjacent ones of the colorimetric cameras 20 overlap each other as illustrated in FIG. 22 when these colorimetric cameras 20 cause the distance calculators 58 or the tilt calculators 59 to simultaneously perform the above-described distance calculation or the above-described tilt calculation. This may result in inaccurate calculation of the ranges of the above-described low-luminance regions RO_l, further resulting in inappropriate calculation of the distances and the tilts. Given this situation, in a configuration having a plurality of colorimetric cameras 20 linearly arranged next to one another in a direction perpendicular to a conveyance direction of recording media M, it is desirable that adjacent ones of the colorimetric cameras 20 cause the distance calculators 58 or the tilt calculators 59 to perform the distance calculation or the tilt calculation at different timing.

Figure 23:
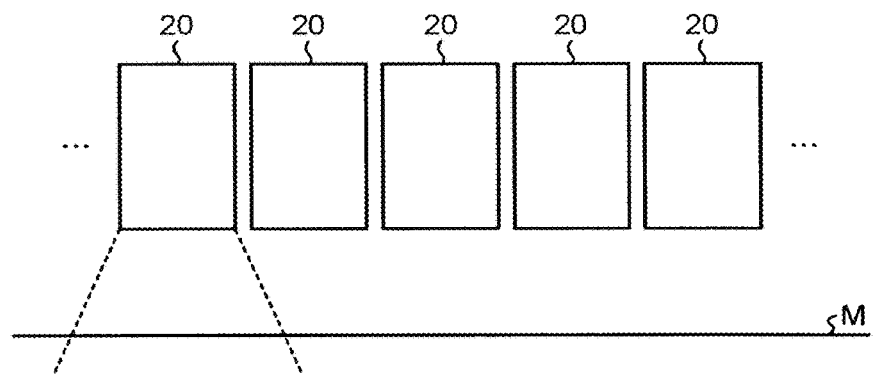
FIG. 23 is a diagram explaining an example of a case where a plurality of colorimetric cameras, one after another in sequence, calculate distances or tilts.
Figure 24:
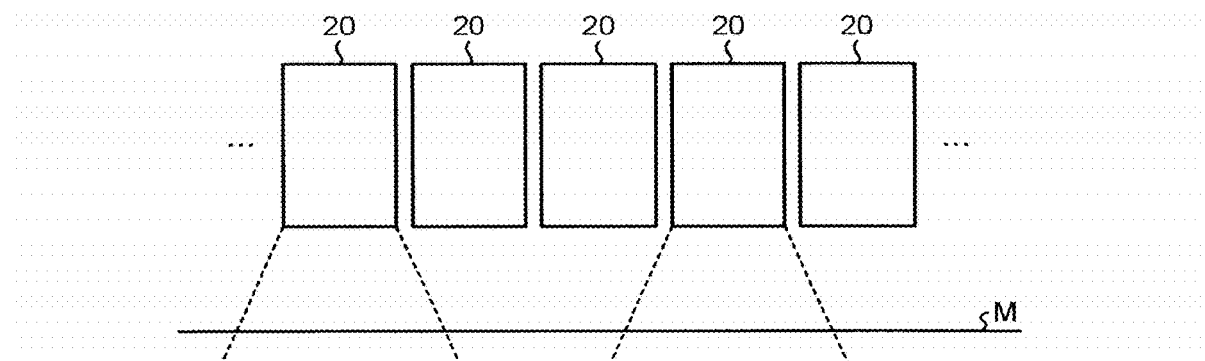
FIG. 24 is a diagram explaining an example of a case where a plurality of colorimetric cameras not adjacent to each other simultaneously calculate distance or tilts.
Figure 25:
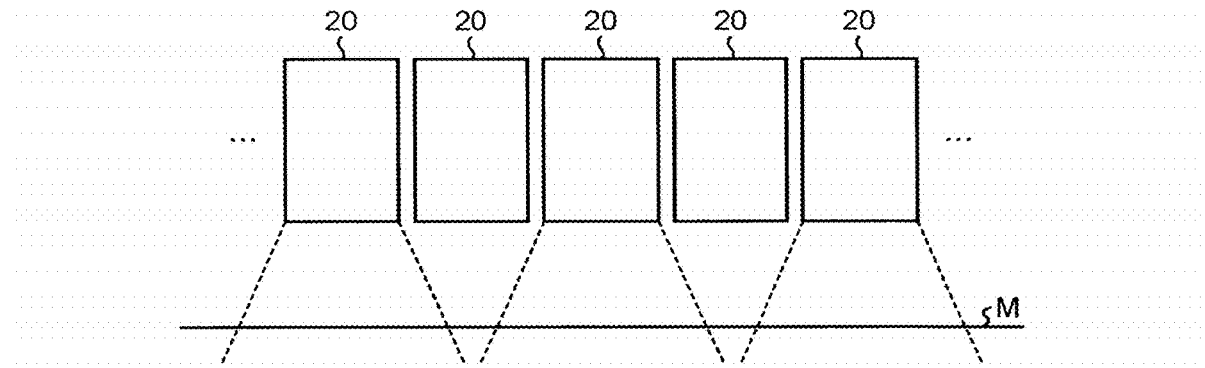
FIG. 25 is a diagram explaining an example of a case where first colorimetric cameras and second colorimetric cameras alternately calculate distances or tilts, the first colorimetric cameras being identified with odd numbers in the arrangement sequence of the colorimetric cameras, the second colorimetric cameras being identified with even numbers in the arrangement sequence.

For example, a configuration in which a plurality of linearly arranged colorimetric cameras 20 perform the distance calculation or the tilt calculation one after another in sequence as illustrated in FIG. 23 prevents overlapping of light from the light sources 28 of adjacent ones of the colorimetric cameras 20, thereby enabling appropriate calculation of the distances and the tilts. Another configuration in which those not adjacent to each other of a plurality of colorimetric cameras 20 simultaneously perform the distance calculation or the tilt calculation as illustrated in FIG. 24 is more efficient than a configuration in which the colorimetric cameras 20 perform the distance calculation or the tilt calculation one after another in sequence. Still another configuration is extremely efficient in which, as illustrated in FIG. 25, with a plurality of linearly arranged colorimetric cameras 20 being identified with numbers the sequence of which agrees with the sequence in which the colorimetric cameras 20 are arranged, the colorimetric cameras identified with odd numbers (1, 3, 5, etc.) and the colorimetric cameras identified with even numbers (2, 4, 6, etc.) alternately calculate the distances or the tilts. This is because calculation of the distances and the tilts in all of the colorimetric cameras 20 can be completed with two times of the calculation no matter how many colorimetric cameras 20 are included.

Control functions of the units included in the image forming apparatuses 100 and 200 and each of the colorimetric cameras 20 (image capturing apparatuses) in the above embodiment and modifications can be implemented by hardware, software, or a combined configuration using both hardware and software. When the control functions of the units included in the image forming apparatuses 100 and 200 and the colorimetric camera 20 (image capturing apparatus) are implemented by software, processors included in the image forming apparatuses 100 and 200 and the colorimetric camera 20 (image capturing apparatus) execute computer programs having processing sequences written therein. Each of the computer programs to be executed by the processors is, for example, embedded and provided in a ROM or the like inside a corresponding one of the image forming apparatuses 100 and 200 and the colorimetric camera 20 (image capturing apparatus). A computer program to be executed by any one of the processors may be recorded and provided in a non-transitory computer-readable recording medium such as a compact disc read-only memory (CD-ROM), a flexible disk (FD), a compact disc recordable (CD-R), or a digital versatile disc (DVD), as an installable or executable file. A computer program to be executed by any one of the processors may be stored in a computer connected to a network such as the Internet and provided by being downloaded over the network. A computer program to be executed by the processor may be provided or distributed over a network such as the Internet.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program. Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc. Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

According to the embodiments of the present invention, the effect of enabling easy and convenient measurement of the distance between a casing and an object can be obtained.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. An image capturing apparatus, comprising:
   a casing having an opening;
   a light source arranged inside the casing;
   a sensor arranged inside the casing and configured to capture, through the opening, an image of an object positioned outside the casing while the light source is on, wherein the casing shades at least part of light emitted from the light source to an outside of the casing via the opening so that low-luminance regions are formed in the image; and
   processing circuitry configured to calculate a distance between the casing and the object, based on the image that has been captured by the sensor, the image including, within an image region of the object defined by the opening, a high-luminance region and the low-luminance regions located on outer sides of the high-luminance region.

2. The image capturing apparatus according to claim 1, wherein, based on a ratio of a size of the low-luminance regions to a size of the high-luminance region, the processing circuitry is configured to calculate the distance.

3. The image capturing apparatus according to claim 1, further comprising:
   a memory storing a first correspondence table indicating a correspondence relation between a size of the low-luminance regions or of the high-luminance region and the distance, wherein
   based on the size of the low-luminance regions or of the high-luminance region and the first correspondence table, the processing circuitry is configured to calculate the distance.

4. The image capturing apparatus according to claim 1, wherein the processing circuitry is further configured to correct color information on the high-luminance region, based on the calculated distance.

5. The image capturing apparatus according to claim 1, wherein the processing circuitry is further configured to calculate a relative tilt between the casing and the object, based on the image.

6. The image capturing apparatus according to claim 5, wherein, based on a ratio of a size of the low-luminance regions to a size of the high-luminance region, the processing circuitry is configured to calculate the tilt.

7. The image capturing apparatus according to claim 5, further comprising:
   a memory storing a second correspondence table indicating a correspondence relation between a size of the low-luminance regions or of the high-luminance region and the tilt, wherein
   based on the size of the low-luminance regions or of the high-luminance region and the second correspondence table, the processing circuitry is configured to calculate the tilt.

8. The image capturing apparatus according to claim 5, wherein the processing circuitry is further configured to correct color information on the high-luminance region, based on the calculated tilt.

9. The image capturing apparatus according to claim 1, wherein the processing circuitry is further configured to calculate colorimetric values of the object, based on color information on the high-luminance region.

10. An image forming apparatus comprising the image capturing apparatus according to claim 1.

11. The image forming apparatus according to claim 10, wherein
- a plurality of the image capturing apparatuses are arranged next to one another in a direction perpendicular to a conveyance direction of recording media, and
- in adjacent ones of the image capturing apparatuses, at least the calculation of the distances is performed at different timing.

12. A distance measuring method to be performed by an image capturing apparatus including a casing having an opening, a light source arranged inside the casing, and a sensor arranged inside the casing and configured to capture, through the opening, an image of an object positioned outside the casing while the light source is on, wherein the casing shades at least part of light emitted from the light source to an outside of the casing via the opening so that low-luminance regions are formed in the image, the distance measuring method comprising:
- calculating a distance between the casing and the object, based on the image captured by the sensor, the image including, within an image region of the object defined by the opening, a high-luminance region and the low-luminance regions located on outer sides of the high-luminance region.

13. A non-transitory computer-readable recording medium that contains a computer program for causing an image capturing apparatus to implement a method, the image capturing apparatus including a casing having an opening, a light source arranged inside the casing, and a sensor arranged inside the casing and configured to capture, through the opening, an image of an object present outside the casing while the light source is on, wherein the casing shades at least part of light emitted from the light source to an outside of the casing via the opening so that low-luminance regions are formed in the image, the method comprising:
- calculating a distance between the casing and the object, based on the image captured by the sensor, the image including, within an image region of the object defined by the opening, a high-luminance region and the low-luminance regions located on outer sides of the high-luminance region.

* * * * *